United States Patent
Seo et al.

(10) Patent No.: US 8,489,148 B2
(45) Date of Patent: Jul. 16, 2013

(54) DEVICE AND METHOD FOR EXPRESSING STATUS OF TERMINAL USING CHARACTER

(75) Inventors: Jeong-Wook Seo, Daegu (KR); Jae-Ho Kim, Gum-si (KR); Chi-Hyeon Paek, Gum-si (KR); Jong-Kerl Lee, Gumi-si (KR); Wei-Jin Park, Seoul (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 797 days.

(21) Appl. No.: 11/594,229

(22) Filed: Nov. 8, 2006

(65) Prior Publication Data

US 2007/0111755 A1 May 17, 2007

(30) Foreign Application Priority Data

Nov. 9, 2005 (KR) .................. 10-2005-0107174

(51) Int. Cl.
*H04M 1/00* (2006.01)
(52) U.S. Cl.
USPC ............................................... 455/566
(58) Field of Classification Search
USPC .............. 455/566; 704/257, 260, 246, 270, 704/275, 270.1, 276, 207, 272; 345/473
See application file for complete search history.

(56) References Cited

U.S. PATENT DOCUMENTS

| | | | |
|---|---|---|---|
| 6,546,263 B1* | 4/2003 | Petty et al. .................... | 455/566 |
| 6,792,406 B1* | 9/2004 | Fujimura et al. ............... | 704/257 |
| 2001/0023405 A1* | 9/2001 | Nagisa ........................... | 705/10 |
| 2003/0115240 A1* | 6/2003 | Cho ............................. | 709/102 |
| 2004/0029626 A1 | 2/2004 | Annunziata | |
| 2004/0089141 A1* | 5/2004 | Georges et al. ................. | 84/609 |
| 2005/0113072 A1* | 5/2005 | Rodriguez et al. ............. | 455/413 |
| 2005/0190188 A1 | 9/2005 | Anzawa et al. | |

FOREIGN PATENT DOCUMENTS

| | | |
|---|---|---|
| EP | 1072297 A1 | 1/2001 |
| EP | 1396984 A1 | 3/2004 |
| EP | 1 589 734 | 10/2005 |
| EP | 1 589 735 | 10/2005 |
| EP | 1 592 212 | 11/2005 |
| EP | 1 675 052 | 6/2006 |
| EP | 1 701 523 | 9/2006 |
| JP | 01033830 | 2/1989 |
| JP | 2002219277 | 8/2002 |

(Continued)

OTHER PUBLICATIONS

Ihle_EP1396984A1_pub. date—Oct. 3, 2004.pdf.*

*Primary Examiner* — Kwasi Karikari
*Assistant Examiner* — Alexander Yi
(74) *Attorney, Agent, or Firm* — Roylance, Abrams, Berdo and Goodman, LLP

(57) ABSTRACT

A status expression system and method operating the same are provided for presenting a state of the mobile phone by means of a character agent. A status expression system of the present invention includes a memory for storing a plurality of character quotients, information on at least one state transition model, and resources for presenting the character; a character controller for updating the character quotients according to events occurred in the mobile phone, determining a state by analyzing the character quotients and referring to the state transition model, and formatting the state using the resources assigned for the state of the character; and a display for presenting the character with the resources in the state.

21 Claims, 45 Drawing Sheets

FOREIGN PATENT DOCUMENTS

| | | |
|---|---|---|
| JP | 2004-033690 | 2/2004 |
| JP | 10-2004-0180261 | 6/2004 |
| KR | 1020000006885 | 2/2000 |
| KR | 100302842 | 7/2001 |
| KR | 10-2004-0056386 A | 7/2004 |
| KR | 10-2005-0011763 A | 1/2005 |
| KR | 10-2006-0122631 A | 11/2006 |
| KR | 2006-0041119 A | 11/2006 |

* cited by examiner

FIG. 2a
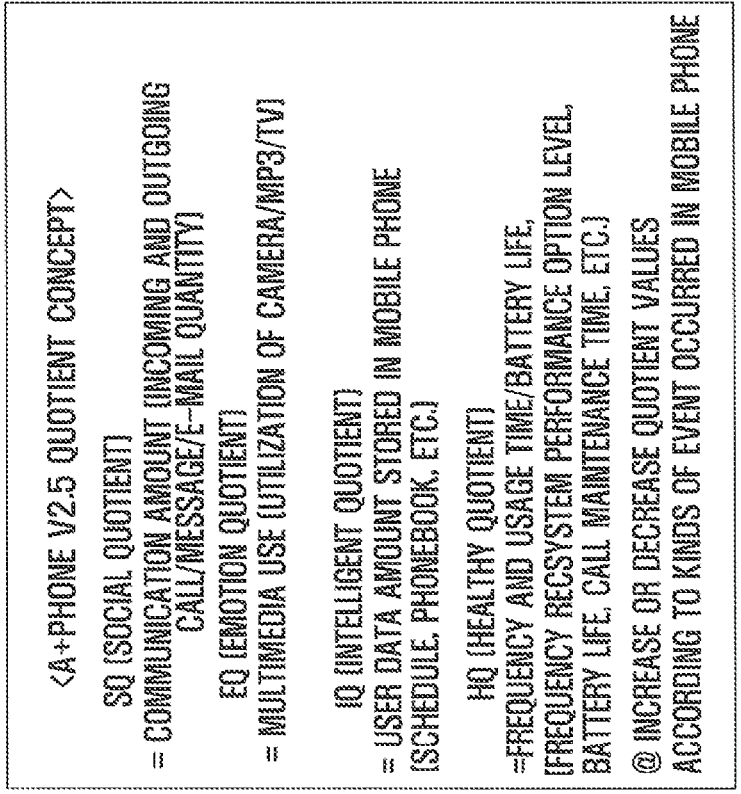
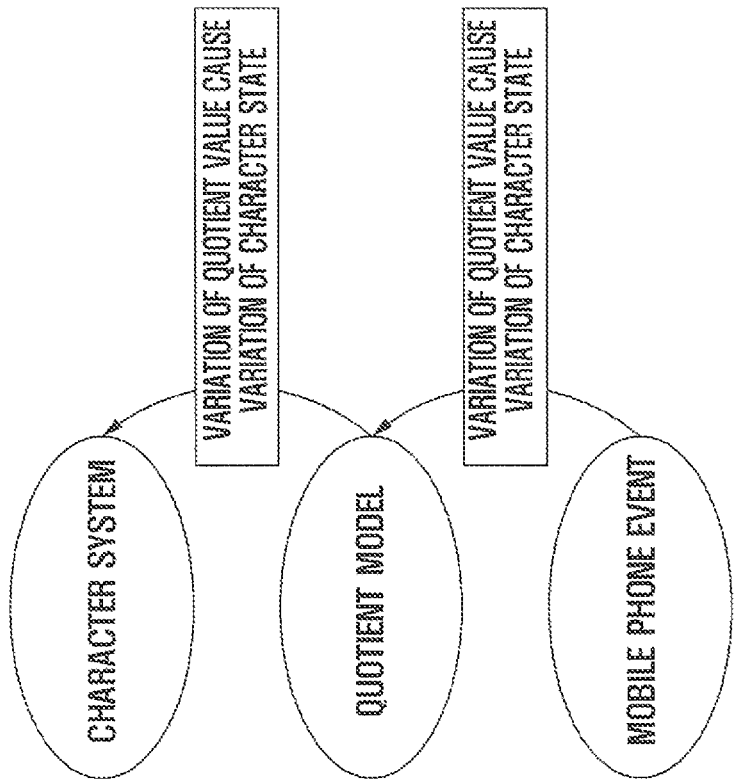

FIG. 3A
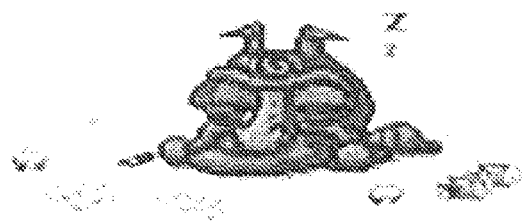 
LAZE STATE        SMART STATE

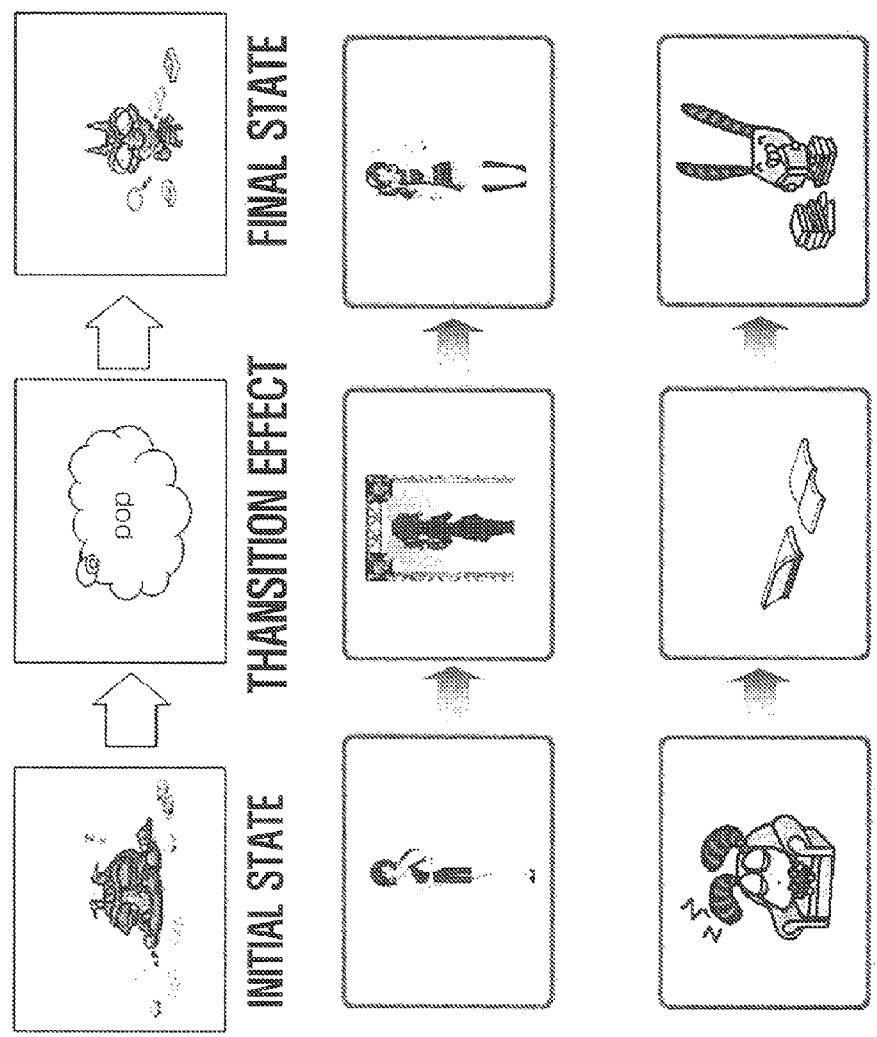

PRIOR STATE (PARTY GIRL)

1. PRESENT STATE TRANSITION
ANIMATION GIVING HINT OF POSTERIOR STATE

2. PRESENT CHARACTER
IN POSTERIOR STATE

AFTER STATE TRANSITION

FIG. 6Ab
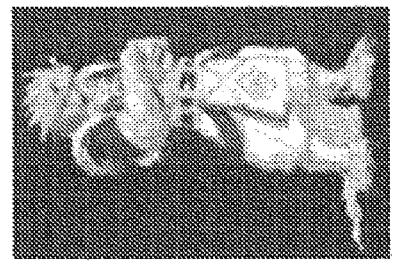
FIG. 6Ad
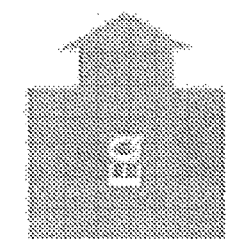
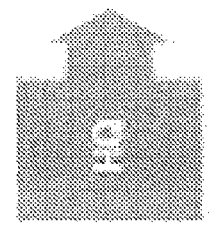
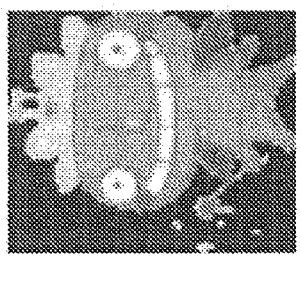
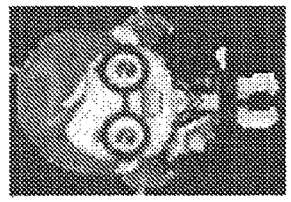
FIG. 6Aa
FIG. 6Ac
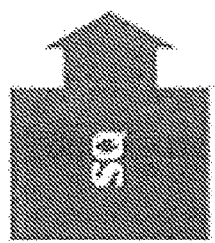
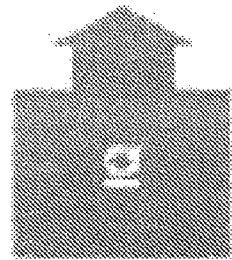

| | HQ | EQ | IQ | SQ |
|---|---|---|---|---|
| HQ | H,H(S0) | E,H(S1) | I,H(S3) | S,H(S6) |
| EQ | H,E(S1) | E,E(S2) | I,E(S4) | S,E(S7) |
| IQ | H,I(S3) | E,I(S4) | I,I(S5) | S,I(S8) |
| SQ | H,S(S6) | E,S(S7) | I,S(S8) | S,S(S9) |

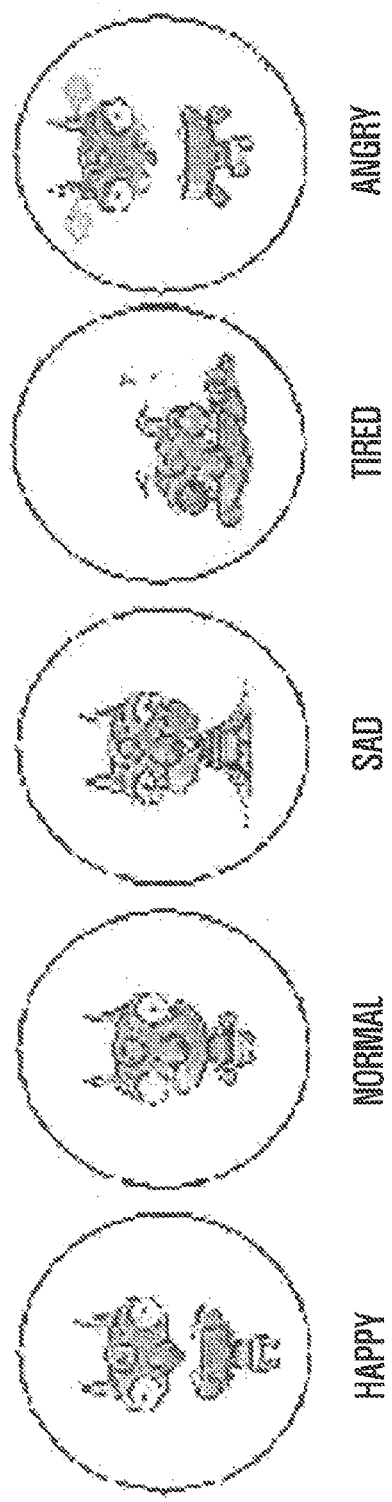

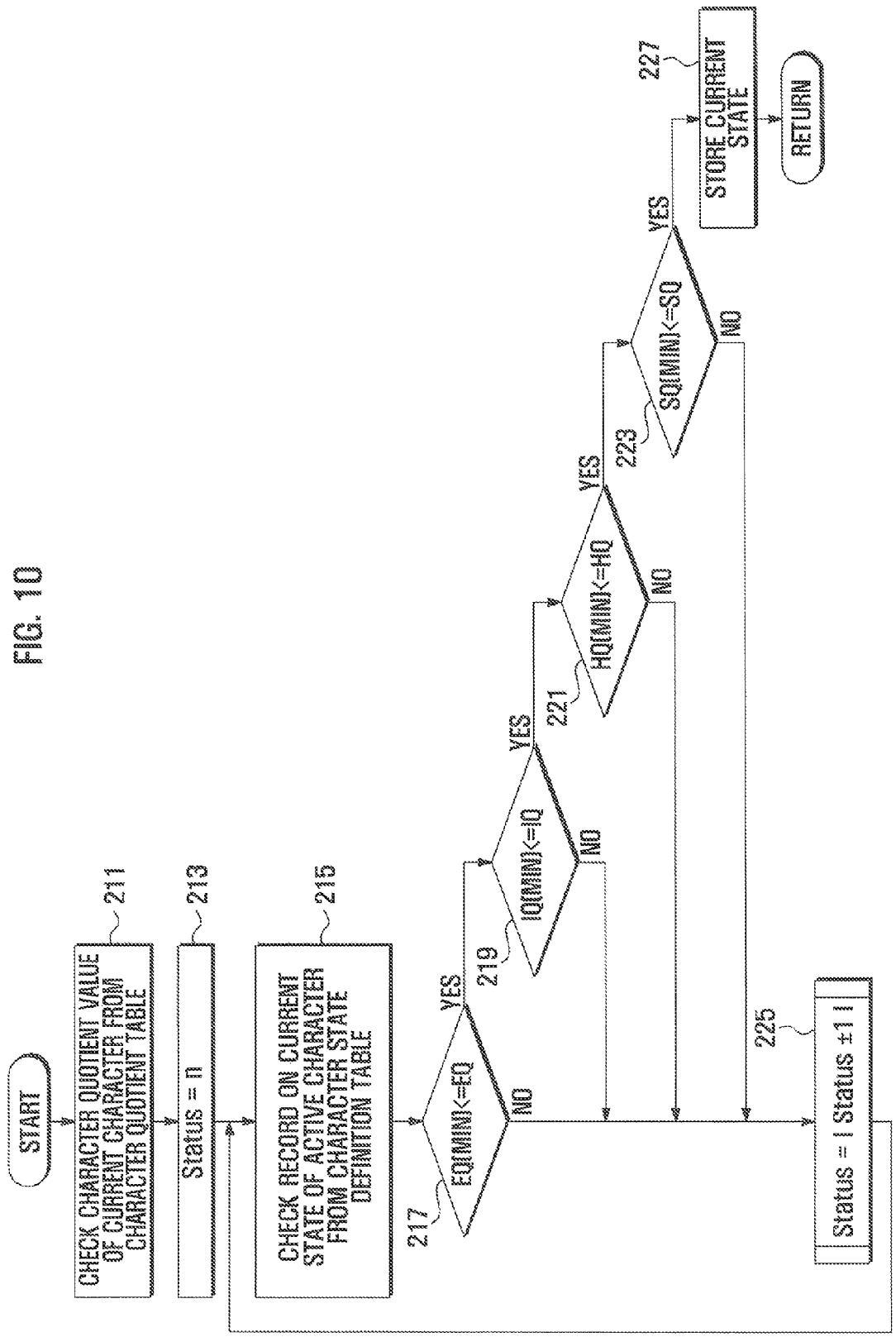

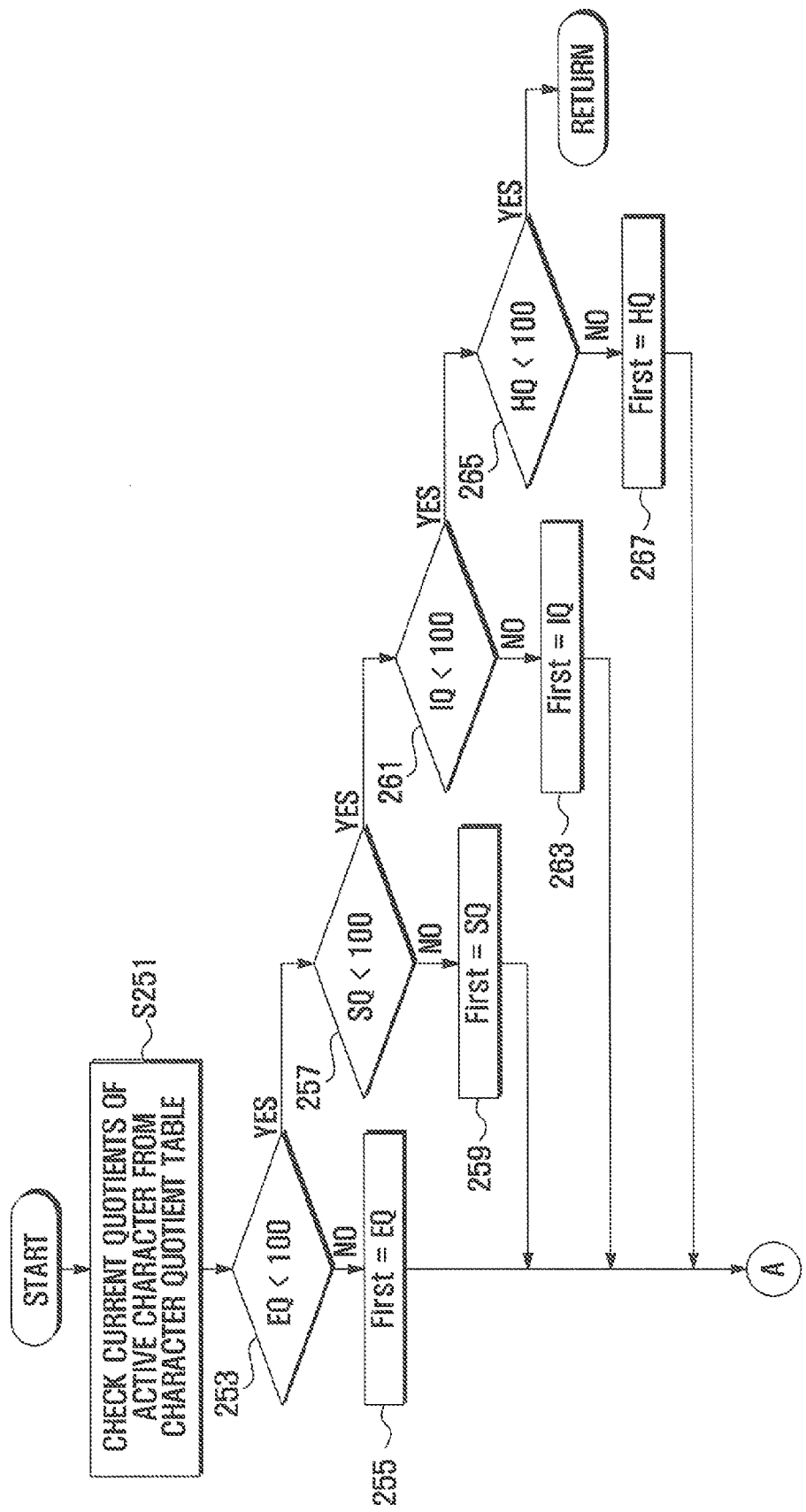

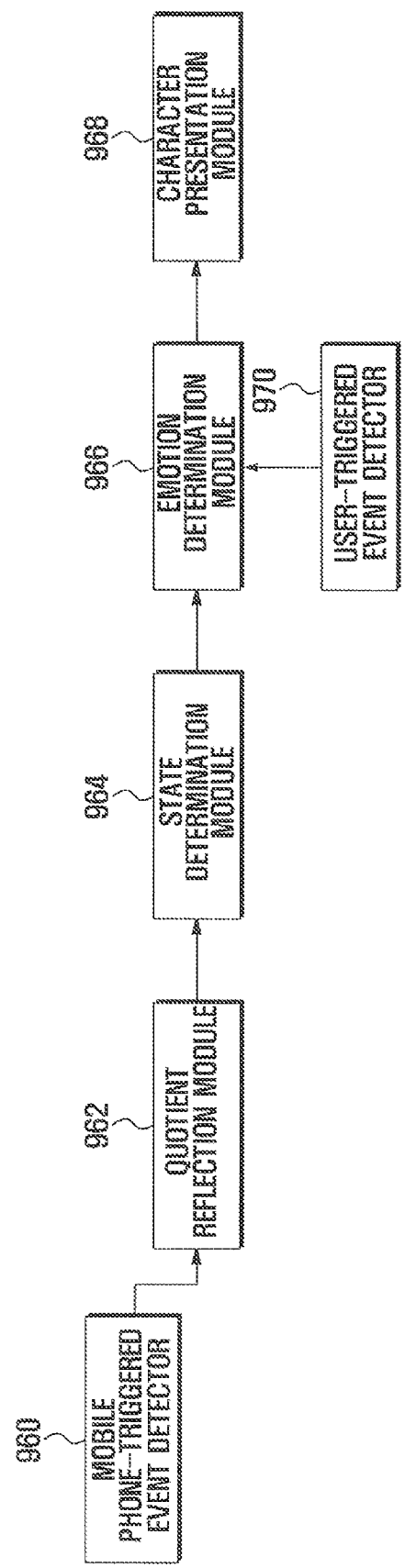

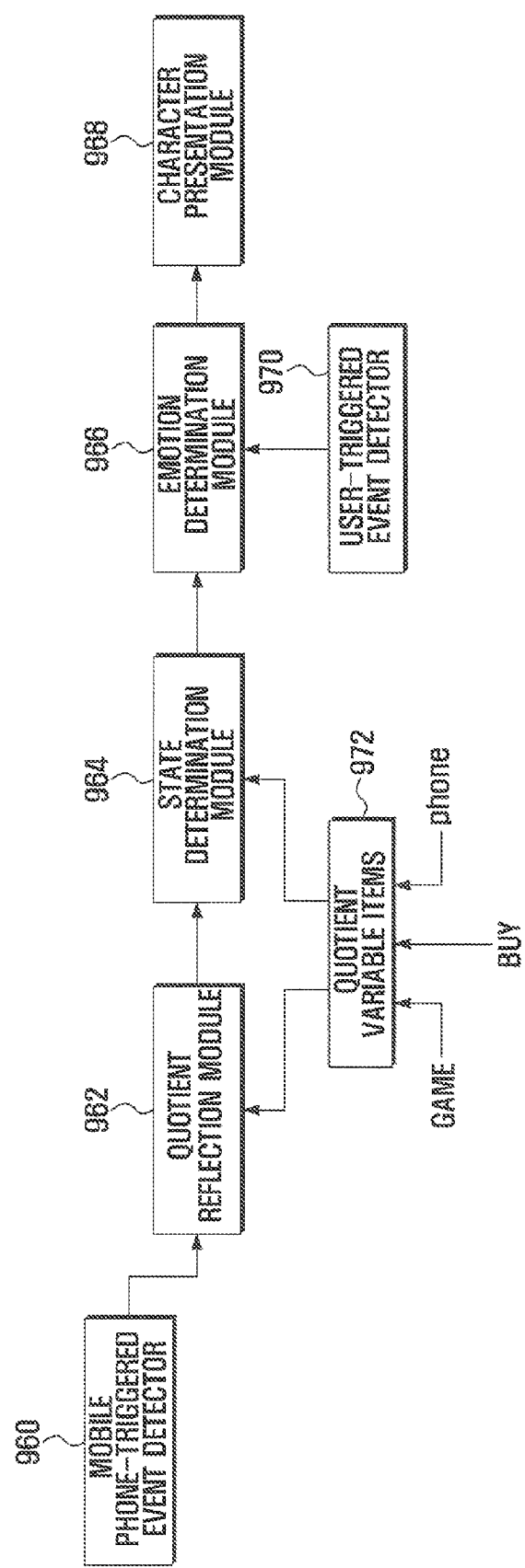

DEVICE AND METHOD FOR EXPRESSING STATUS OF TERMINAL USING CHARACTER

BACKGROUND OF THE INVENTION

1. Field of the Invention

The present invention relates to a mobile phone and, in particular, to a status expression system and method operating the same that are capable of presenting a state of the mobile phone in the form of an animated virtual character.

2. Description of the Related Art

Generally, a portable terminal means a cordless electronic device, especially represented by a mobile phone. Recent mobile phones are implemented with various functions in addition to basic voice communication. Such phones include a camera phone equipped with a camera module, a digital TV phone equipped with a Digital Multimedia Broadcast (DMB) or Digital Video Broadcast (DVB) module, and an MP3 phone equipped with an MPEG-1 Audio Layer 3 (MP3) module. That is, the mobile phone has developed into a multipurpose electronic device.

Typically, an advanced mobile phone having an advanced multimedia processing ability is provided with a liquid crystal display (LCD) for displaying multimedia data. In order to effectively display information, various screen display techniques have been researched and developed.

Such multimedia data represented by motion pictures and virtual character animations have become popular in recent years and adapted to the mobile phones. Accordingly, there has been a requirement for developing a virtual space-based user interface for interacting with the operations of a mobile phone.

SUMMARY OF THE INVENTION

It is an object of the present invention to provide a virtual character agent system and method operating the same that are capable of expressing a state of the mobile phone in a virtual space.

It is another object of the present invention to provide a virtual space character agent system and method operating the same that are capable of expressing a state of the mobile phone as a virtual character representing a state transition model selected in accordance with the state of the mobile phone.

It is another object of the present invention to provide a virtual space character agent system and method operating the same that are capable of selecting a target state transition model of a mobile phone in accordance with character quotients reflecting events occurred in the mobile phone.

It is another object of the present invention to provide a virtual space character agent system and method operating the same that are capable of presenting a state of a mobile phone in the form of a character animation and text.

It is another object of the present invention to provide a virtual space character agent system and method operating the same that are capable of presenting a state of a mobile phone, determined on the basis of character quotients representing occurrences of events, in the form of a character animation and text.

It is another object of the present invention to provide a virtual space character agent system and method operating the same that are capable of presenting a state of a mobile phone in the form of an animated character in accordance with an emotion model selected on the basis of a state transition model determined by analyzing conditions of the mobile phone.

It is another object of the present invention to provide a virtual space character agent system and method operating the same that are capable of presenting a state of a mobile phone in the form of an animated character in accordance with an emotion mode selected on the basis of a state transition model determined by character quotients representing events occurred in the mobile phone.

It is another object of the present invention to provide a virtual space character agent system and method operating the same that are capable of presenting a state of a mobile phone in the form of a character animation and text in accordance with an emotion model determined on the basis of a state transition model by character quotients representing events occurred in the mobile phone.

It is another object of the present invention to provide a virtual space character agent system and method operating the same that are capable of presenting a state of a mobile phone in the form of an animated character in accordance with an emotion model determined on the basis of a state transition model by character quotients representing events occurred in the mobile phone, the character quotients changing according to a number of feedback request events and user responses.

In accordance with an aspect of the present invention, the above and other objects are accomplished by a status expression system of a mobile phone. The status expression system includes a memory for storing a plurality of character quotients, information on at least one state transition model, and resources for presenting the character; a character controller for updating the character quotients according to events occurred in the mobile phone, determining a state by analyzing the character quotients and referring to the state transition model, and formatting the state using the resources assigned for the state of the character; and a display for presenting the character with the resources in the state.

In accordance with another aspect of the present invention, the above and other objects are accomplished by a status expression system for a mobile phone. The status expression system includes a memory for storing at least one state transition model and resources for presenting a character; a character agent controller having a character quotient memory for recording events, analyzing cases associated with the events, arranging the cases in an order of priorities, presenting the character in association with the arranged cases, enabling a user to input feedback events in response to the events, updating the character quotients associated with the events in the character quotient memory; a character presentation controller for determining a state of the character by analyzing the character quotients and formatting the character with the character resources corresponding to the state of the character; and a display for displaying the character with the character resources under the control of the character agent controller.

In accordance with another aspect of the present invention, the above and other objects are accomplished by a method for operating a status expression system for a mobile phone in which a state of the mobile phone is presented by a character. The method includes accumulating, if an event occurs, quotient values associated with the event; determining a state of the character by analyzing the quotient values; and presenting the character with character resources designated for the state.

In accordance with another aspect of the present invention, the above and other objects are accomplished by a status expression system for a mobile phone. The status expression system includes a quotient reflection module for checking kinds and values of quotients associated with an event occurred in the mobile phone and accumulating the values so as to update the character quotients; a state determination module for determining the state of the character with reference to the quotients and a state transition mode; and a character presentation module for presenting the character in the state determined by the state determination module using the resources assigned for the state of the character.

In accordance with another aspect of the present invention, the above and other objects can be accomplished by a status expression system for a mobile phone. The status expression system includes a quotient reflection module for checking kinds and values of quotients associated with the events and accumulating the quotient values as the character quotients; a state determination module for determining the state of the character with reference to the character quotients and the state transition module; an emotion determination module for determining an emotion of the character on the basis of an analysis result on the events in association with the state; and a character presentation module for presenting the character in the state with the emotion using the resources assigned for the state and emotion of the character.

In accordance with another aspect of the present invention, the above and other objects are accomplished by a status expression system for a mobile phone. The status expression system includes an event collector for recording events occurred in the mobile phone; a memory for storing quotient-changing items and state-changing items that are changing quotient values and states of characters; a quotient reflection module for checking kinds and values of the quotients associated with an event occurred in the mobile phone and accumulating the values so as to update the quotients; a state determination module for determining a state of the mobile phone on the basis of the quotients and a state of the character according to the state-changing item; and a character presentation module for presenting the character in the state determined by the state determination module.

In accordance with another aspect of the present invention, the above and other objects are accomplished by a status expression system for a mobile phone. The status expression system includes an event collector for recording events occurred in the mobile phone; a memory for storing quotient-changing items and state-changing items that are changing quotient values and states of characters; a quotient reflection module for checking kinds and values of the quotients associated with an event occurred in the mobile phone and accumulating the values so as to update the quotients; a state determination module for determining a state of the mobile phone on the basis of the quotients and a state of the character according to the state-changing item; an emotion determination module for determining an emotion of the character on the basis of an analysis result on the events in association with the state; and a character presentation module for presenting the character in the state determined by the state determination module and with the emotion determined by the emotion determination module.

In accordance with another aspect of the present invention, the above and other objects can be accomplished by a method for operating a status expression system for a mobile phone in which a state of the mobile phone is presented by a character. The method includes accumulating, if an event occurs, quotient values associated with the event; determining a state transition if a quotient has a value greater than a predetermined threshold value; and presenting the character in a transited state.

In accordance with another aspect of the present invention, the above and other objects are accomplished by a method for operating a status expression system for a mobile phone in which a state of the mobile phone is presented by a character. The method includes accumulating, if an event occurs, quotient values associated with the event; determining a state transition if a quotient has a value greater than a predetermined threshold value; and determining an emotion of the character in a transited state of the character; and presenting the character with the emotion in the transited state.

In accordance with another aspect of the present invention, the above and other objects are accomplished by a method for operating a status expression system for a mobile phone. The method includes recording events occurred in the mobile phone; detecting an input for selecting a quotient-changing item; changing values of quotients on the basis of kinds and amounts of the quotients designated for the events or the quotient-changing item; determining a state of a character on the basis of the quotients; and presenting the character in the state.

In accordance with another aspect of the present invention, the above and other objects are accomplished by a method for operating a status expression system for a mobile phone. The method includes recording events occurred in the mobile phone; detecting an input for selecting a quotient-changing item; changing values of quotients on the basis of kinds and amounts of the quotients designated for the events or the quotient-changing item; determining a state of the character on the basis of the quotients; determining an emotion of the character on the basis of the state and the quotients; and presenting the character in the determined state with the determined emotion.

BRIEF DESCRIPTION OF THE DRAWINGS

The above and other objects, features and advantages of the present invention will be more apparent from the following detailed description in conjunction with the accompanying drawings, in which:

FIG. 2a is a schematic diagram illustrating a procedure for determining a character agent behavior in a status expression system-embedded mobile phone according to an embodiment of the present invention;

FIGS. 6a to 6c are drawings illustrating transformation state transition model of a character system according to an embodiment of the present invention;

FIGS. 7a and 7b are drawings illustrating exemplary emotion models of a character system according to an embodiment of the present invention;

FIG. 10 is a flowchart illustrating a growth state determination procedure of a method for operating a character system in FIG. 9;

FIG. 26b is a block diagram illustrating a configuration of a status expression system according to an embodiment of the present invention when mobile phone-triggered events and user-triggered events are used;

FIG. 26d is a block diagram illustrating a configuration of a status expression system according to an embodiment of the present invention when special items are used.

DETAILED DESCRIPTION OF EXEMPLARY EMBODIMENTS

Figure 1:
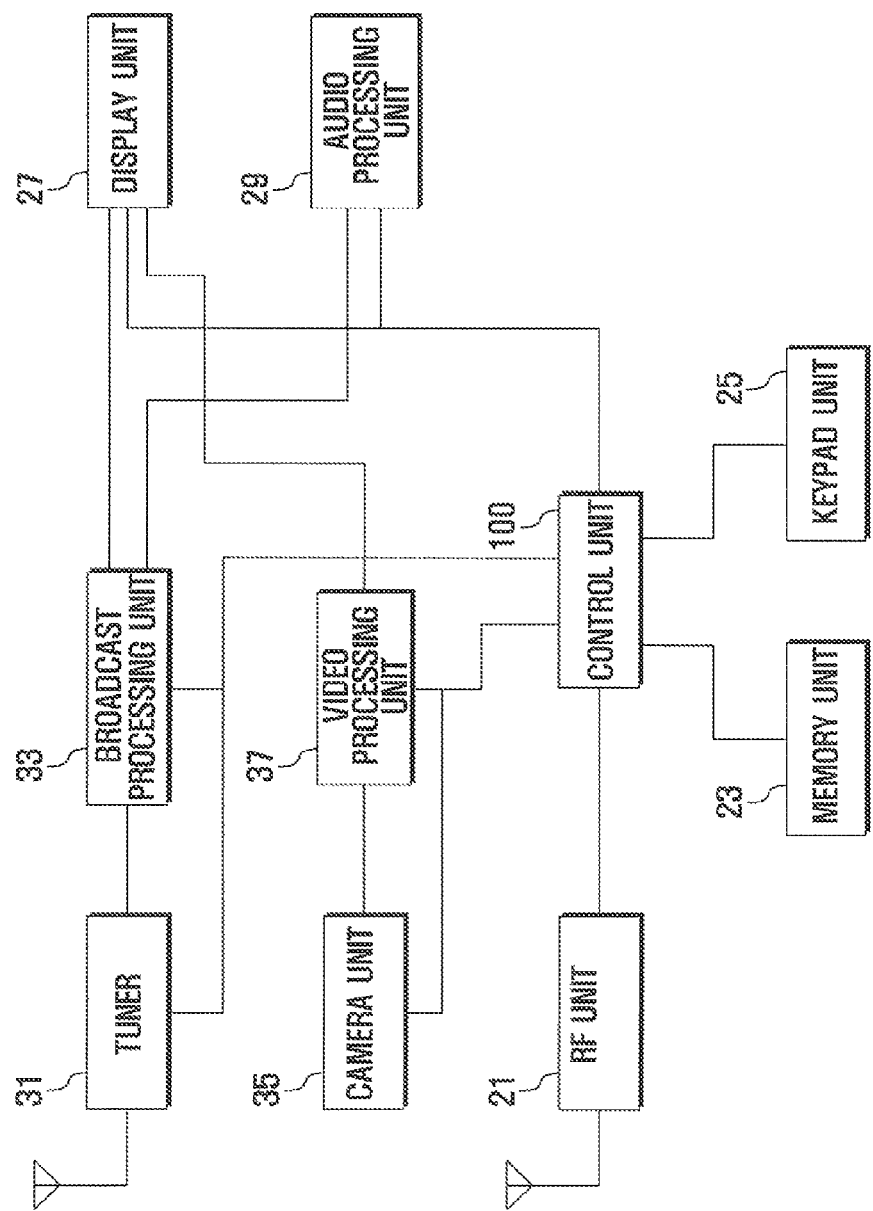
FIG. 1 is a block diagram illustrating a configuration of a mobile phone according to an embodiment of the present invention.

Exemplary embodiments of the present invention are described with reference to the accompanying drawings in detail. The same reference numbers will be used throughout the drawings to refer to the same or like parts. Detailed descriptions of well-known functions and structures incorporated herein may be omitted to avoid obscuring the subject matter of the present invention.

Note that the same or similar elements in the drawings are designated by the same reference numerals as far as possible although they are shown in different drawings.

The following definitions are provided to enable a clear and consistent understanding of the detailed description and the claims. Unless otherwise noted, terms are to be understood according to conventional usage by those skilled in the relevant art.

A "character" is a visual object expressing a state of mobile phone in the form of emotional animation. The term "character" is used interchangeably with an "avatar."

A "Character quotient" is value obtained by quantifying a specific property influencing a motion of the character, which varies according to events occurred in the mobile phone, in a character agent system. In the present invention, various quotients are utilized and each quotient is associated with classified events. The character agent system consists of a character system and an agent system. The character system analyzes the character quotients so as to determine a character state and creates an emotion of the character on the basis of the character state in cooperation with the agent system. The emotion of the character cannot be used. The agent system presents usage examples according to the event occurrences by means of the character, processes feedbacks from the user, and presents the process result by means of the character. A "state transition model" is a system for presenting a state of the mobile phone for operating a character agent function. The character state is determined on the basis of the character quotients analyzed by the character system. An "emotion model" means a system for determining the character state and presenting an emotion of the character representing the state of the mobile phone in cooperation with the agent system. The emotion of the character is determined on the basis of an analysis of feedbacks from the user.

In the present invention, the mobile terminal is implemented with a character agent. The character agent recognizes events occurred in the mobile phone, runs tasks associated with the events, and reports the results in verbal words or actions. In order to implement the character agent based interface, the events are assigned quotient values, respectively, such that the character quotients are updated whenever the events occur. In the present invention, a plurality of character quotients is used and the mobile phone is provided with an application for operating the character agent and a character database. The character database includes an event table for mapping the quotient values to the events, a state definition table for determining state transition models, and a character resource table for presenting the state transition model.

The state transition model of the character includes a growth state transition model, transformation state transition model, and a combination state transition model combining the growth and transformation state transition models. The growth state transition model determines a presentation priority, which determines a range of the character quotient. The growth state transition model is characterized in that a higher priority state transition model is selected as the quotient level increases by the accumulation of the quotient values. The transformation state transition model is characterized in that if a specific character quotient is high, a state transition model corresponding to the high character quotient. The combination state transition model is selected in consideration of the growth state transition model and the transformation state transition model.

The mobile phone analyzes the character quotients, determines a target state on the basis of the analysis result, and selects a character corresponding to the state transition model.

Each state transition model is provided with a plurality of emotions. In this case, the mobile phone determines a target state on the basis of the analysis of the character quotients, selects at least one emotion associated with the target state, and selects a character corresponding to the emotion.

FIG. 1 is a block diagram illustrating a configuration of a mobile phone according to an embodiment of the present invention.

As shown in FIG. 1, the mobile phone includes a radio frequency (RF) unit 21, a memory unit 23, a keypad unit 25, a display unit 27, an audio processing unit 29, a tuner 31, a broadcast processing unit 33, a camera unit 35, a video processing unit 37 and a control unit 100.

The RF unit 21 enables the mobile phone to communicate with other terminals over a wireless channel. The RF unit 21 includes an RF transmitter for up-converting and amplifying the frequency of a transmitted signal, and an RF receiver for low-noise amplifying a received signal and down-converting the frequency of the received signal.

The keypad unit 25 is provided with a plurality of alphanumeric keys for input data and functions key for setting various functions, especially for operating the character agent according to an embodiment of the present invention.

The memory 23 includes a program memory and a data memory. The program memory stores programs for processing incoming and outgoing calls, and programs for controlling the expression of the character agent in accordance with various events occurred in the mobile phone. The data memory temporarily stores data generated while executing the programs. The data memory also stores databases registering information for operating the character agent according to an embodiment of the present invention.

The databases include a character quotient table storing character quotients associated with the events, a character quotient accumulation table storing data for determining state transition models of the mobile phone, a state definition table for determining state transition models, and a character resource table registering character resources for presenting the character corresponding to the state transition model. The state definition table includes a growth state definition table, a transformation state definition table, a combination state definition table.

The controller 100 controls general operations of the mobile phone. The controller 100 is provided with a modem for modulating/demodulating signals and codec for encoding/decoding the signals. The controller 100 can be a mobile station modem (MSM) chip. The modem and codec can be implemented as a data processing unit separated from controller 100. In this case, the data processing is preferably arranged between the RF unit 210 and the controller 100. The controller 100 controls operations in a communication mode, camera mode, and broadcast receiver mode.

The controller 100 also controls to present operations of the character agent. In a first embodiment of the present invention, the controller 100 includes a character quotient module for recognizing events and updating the character quotients and a character expression module for selecting a target state transition model on the basis of the character quotients and creating a character expression using the character resources dependent on the state transition model.

In a second embodiment of the present invention, the controller 100 includes a character quotient module for recognizing events and updating the character quotients, a state selection module for selecting a target state on the basis of the state analysis result on the mobile phone, and an emotion selection module for selecting at least one emotion and creating character expression using the character resources dependent on the emotion.

The camera unit 35 is operated in a camera mode under the control of the control unit 100. The video processing unit 37 reformats video signals output from the camera unit 35 to the display unit 27, stores the video signals after encoding in a predetermined coding scheme, and decoding video signals received from outside or stored in the memory unit 23 for playback, under the control of the controller 100. The video processing unit 37 controls the display unit 27 to displays the video signals.

The tuner 31 selectively receives broadcasting signals. The broadcast processing unit 33 performs demodulation and decoding on the broadcasting signals so as to output video signals to the display unit 27 and to output audio signals to the audio processing unit 29. The broadcasting signals are digital signals, e.g. satellite broadcasting signals and terrestrial broadcasting signals.

The display unit 27 presents menus associated with operations of the mobile phone under the control of the control unit 100 and the character agent created in accordance with occurrence of event.

The display unit 27 presents the video signals output from the video processing unit 37 in the camera mode and the broadcast processing unit 33 in the broadcast receiver mode.

The audio processing unit 29 processes the audio signal under the control of the control unit 100 in the communication mode and processes the audio signal under the control of the video processing unit 37 in the camera mode, and processes the audio signal under the control of the broadcast processing unit 33 in the broadcast receiver mode.

The camera-related elements, i.e. the camera unit 35 and video processing unit 37, and the broadcast-related elements, i.e. the tuner 31 and the broadcast processing unit 33 can be excluded from the mobile phone. Even in this case, the character agent-related functions can be performed. The character agent is referred to as "avatar" hereinafter.

In the mobile phone implemented with a character agent-based interface, the character agent analyzes a mobile phone usage pattern of the user and facilitates to use various functions of the mobile phone. Additionally, the character agent can express emotion-rich behaviors with various visual effects. That is, the character agent system translates the events occurred in the mobile phone into the character quotients and presents the state of the mobile phone in the form of the character agent expressing an emotion determined on the basis of the character quotients.

The character agent system of the mobile phone consists of a character system and agent system. The character system translates the events into quotient values and determines the emotion of the character so as to present the character agent with an emotion-rich behavior in cooperation with the agent system. The character system creates a character emotion reflecting the state of the mobile and presents the character image together with a voice and text announcement. The character system is provided with a plurality of sub character systems for updating the character quotients and the state of the mobile phone. Each sub system is provided with items and character money and evolves the character quotients and the state of the mobile phone.

If an event occurs in the mobile phone, the agent system determines a use case most closely associated with the event, presents character expression appropriate for the use case, collects a feedback from the user in response to the character expression, and presents a reaction in response to the feedback.

As described above, the character agent system enables presenting the state of the mobile phone as emotional expression of the character agent. In order to present the character agent with an appropriate emotion, the character system and the agent system interoperate.

The state of the mobile phone can be expressed only with the character system. The emotion of the character agent is determined on the basis of the character quotients rather than the user's feedbacks. In this case, the emotion of the character representing the state of the mobile phone can be determined only by the character system.

FIG. 2a is a schematic diagram illustrating a procedure for determining a character agent behavior in a character agent system-embedded mobile phone according to an embodiment of the present invention.

Referring to FIG. 2a, the character quotients are values for quantitatively expressing the factors influencing the variation of the character agent. The character quotients system is called a character quotient model. The character quotients vary according to the events occurred in the mobile phone. If an event occurs, the mobile phone changes at least one quotient associated with the event and evolves the character agent on the basis of the updated character quotient according to the character system.

Figure 2B:
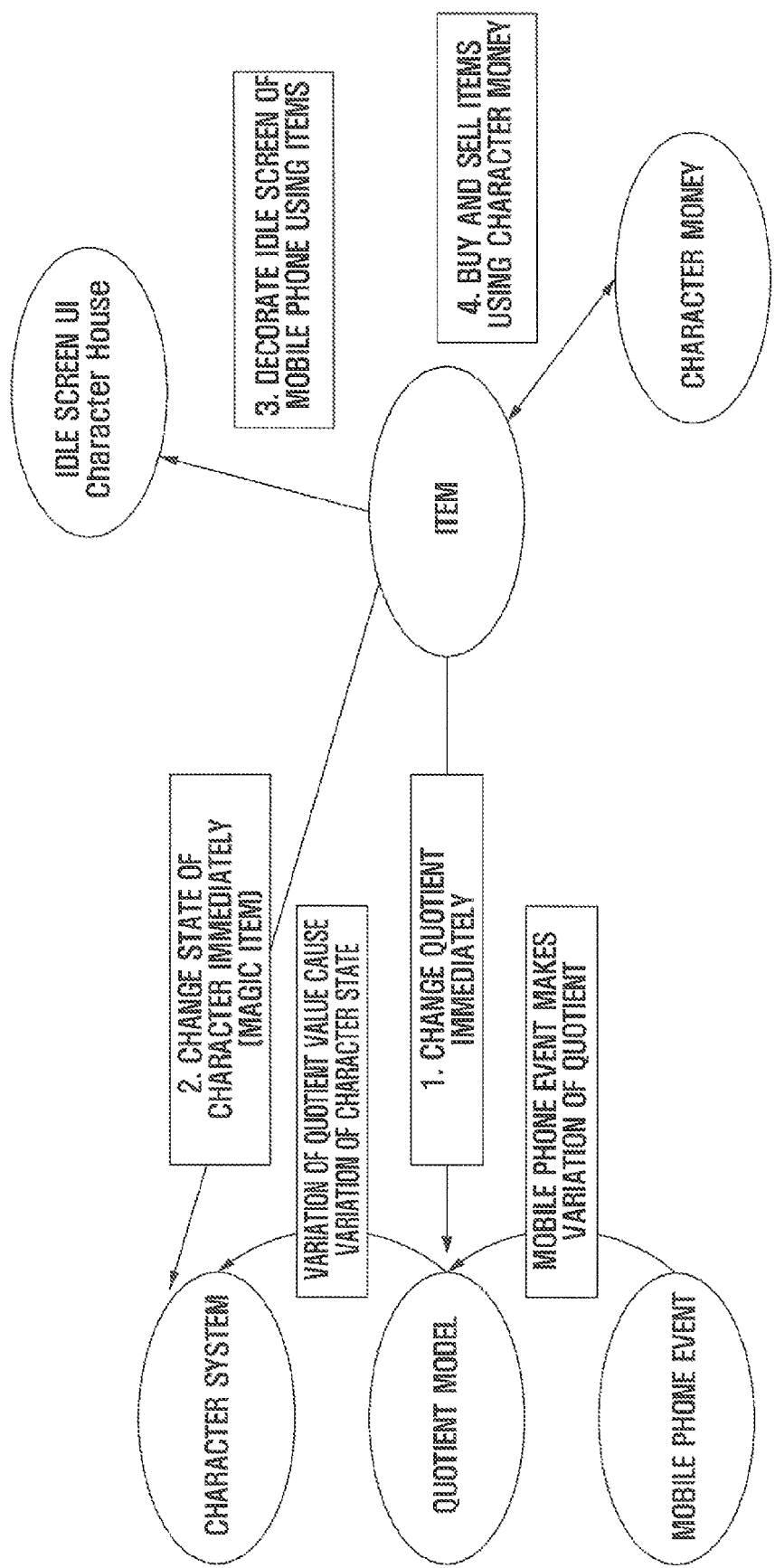
FIG. 2b is a schematic diagram illustrating a procedure for updating character quotients using items and character money (or cyber money) in a status expression system-embedded mobile phone according to an embodiment of the present invention.

FIG. 2b is a schematic diagram illustrating a procedure for updating character quotients using items and character money (or cyber money) in a character agent system-embedded mobile phone according to an embodiment of the present invention.

Referring to FIG. 2b, the character quotients of the character quotient model vary according to occurrences of the events. According to the usage pattern of the user, only a specific character quotient increases. In the case, it is not expected that the character quotients are balanced by themselves. Accordingly, a quotient balancing function is required. Such a quotient balancing can be implemented with various items. The items can be classified into a quotient variable item, a magic item for directly change the emotion of the character, and a decoration item for decorating a screen (character house) in an idle mode of the mobile phone. The individual item can be exchanged with the character money.

In an embodiment of the present invention, the character agent has the characteristics as following.

Each character has a unique character story which gives an identity of the character and defines an initial quotient level and a unique displacement amount scales of the quotients. Each character has various character states (from now on, "state" is interchangeably used with "character state") representing the features of the character. For example, a state of the character can be a feature presented at an intermediate stage on a growth, and can be characterized like a smart state and physically robust state. The state of the character changes according to variations of the character quotients.

There can be various state transition models. In this embodiment, a growth state transition model, a transformation state transition model, and a combination state transition model combining the growth and transformation state transition models.

The growth state transition model allows the character to grow up and down according to the rise and fall of the character quotient. The transformation state transition model configures various character states and selects to present one of the character states according to the change of the character quotient. The transformation state transition model does not grow the character but changes to show a specific expression (for example, a smart look, physically robust look, and angry look).

The character quotients can increase or decrease according to a user's feedback result in response to an event or an agent function.

The character quotients can be obtained according to the procedure of FIG. 2a, and the character quotients can be classified into various types of the character quotients. In this embodiment, the character quotients are classified into a social quotient (SQ) quantifying events related to the communication, physical quotient (PQ) quantifying events related to the performance of the mobile phone, intellectual quotient (IQ) quantifying events related to the information stored in the mobile phone, and emotional quotient (EQ) for quantifying the events related to the multimedia playback.

The state variation of the character occurs according to a state decision algorithm and state quotient information. The character can be presented with a specific expression according to its current state. The character expression can be presented with a sound and text expressions.

The character can be presented with a complex expression representing plural emotions. That is, each character can include a plurality of state transition models and each state transition model can includes a plurality of emotion models. The emotion model includes a "happy," "sad," "normal," "tired," and "angry" states. The emotion of the character can be determined on the basis of the character quotients and/or feedbacks of the user.

The character quotients and states can be adjusted with the items and character money according to the procedure of FIG. 2b. The items include specific items increasing the character quotient or maintain the character state during a predetermined period. The items can be bought in an item store by paying the character money which can be obtained through a game. Some items are allowed to obtain without paying the character money in the item store.

In this embodiment each character has a unique character story. The character story defines a basic personality of the character in the form of a character description script and makes an influence to the character system of the mobile phone in various ways. The character story can be structured as in a role playing game so as to recognize the character's personality. The character story includes a name, personality, nationality or birthplace, and other features such as hobby and unfavorite thing. These factors of the character story are elements defining the unique identity of the character and can be reflected to the character system as shown in the following table 1.

TABLE 1

| Identity | Presentation type |
| --- | --- |
| Name | Basic name of selected character |
| Personality | Character state definition and quotient variation |
| | Influence to State information (important quotient type) |
| | Initial quotient value of each character |
| | Character Voice effect |
| Birthplace (or Nationality) | Influence to voice effect of character and image design |
| Hobby | Assign weight to character when quotients increase or decrease |
| | According to type quotients for events the quotient increase at high rate and decrease at low rate. |

In order to reflect the characteristics of each character, it is required to redefine the characters appropriately for the system. The character description script is prepared for each character and includes description on a design and voice of the character. The character description script may include a basic character information, initial quotient information, quotient weight information, and state definition information.

The basic character information describes the content of the character story and characteristics of the character. The character description script is structured as shown in table 2.

TABLE 2

| Characteristics of character | ID | 0001 |
|---|---|---|
| | Name | Jennifer |
| | Birthplace | London, U.K. |
| | Personality | Meticulous, Energetic, Sensitive |
| | Favorite Things | Cross Quiz, Pop Music |
| | Unfavorite Thing | Chores |
| Background story | | 28 years old professional secretary, born in U.K. She has grown up and lives whole life in London. She loves her job and is meticulous and particular on the work. Her boss calls her Ms. Obsessive compulsive. On the other hand, she is charming and social in her private life. She is outgoing and energetic enough to enjoy party every weekend. But she is also sensitive by nature, and often drops a tear on a cloudy day. |

Each character has basic quotient information which is reflected for presenting the character. Important quotients may be set in high levels and other quotients may be set in low levels. The different quotient levels may be the factors to determine the identity of the character.

Table 3 shows exemplary quotient items of the character and table 4 shows exemplary initial quotient values. In this embodiment, four character quotients are used. The SQ is a quotient obtained by quantifying the events related to the communication. The communication-related events are concerned with a voice communication, short message service (SMS), enhanced messaging service (EMS), multimedia messaging service (MMS), data communication, and local area communication (for example, Bluetooth). The EQ is a quotient obtained by quantifying multimedia-related events concerned with a camera, digital multimedia broadcasting (DMB), digital video broadcasting (DVB), MP3, etc. The IQ is a quotient obtained by quantifying information on user data stored in the mobile phone. The user data are concerned with subscriber information such as a phone book, schedules, alarms, memos. The HQ is a quotient obtained by quantifying performance-related information of the mobile phone. The performance-related information is concerned with radio frequency reception, battery, memory utilization, and the like. In table 4, the initial quotients are set to 0.

TABLE 3

| | Property | Character quotient | Event |
|---|---|---|---|
| 1 | Kindness | SQ | Communication |
| 2 | Sensibility | EQ | Multimedia |
| 3 | Intelligence | IQ | User Data |
| 4 | Physical strength | HQ | Performance |

TABLE 4

| IQ | SQ | HQ | EQ |
|---|---|---|---|
| 0 | 0 | 0 | 0 |

A character is assigned quotients differently weighted according to the characteristic of the character. Table 5 shows increment and decrement quantity units of the character quotients.

TABLE 5

| | IQ | SQ | HQ | EQ |
|---|---|---|---|---|
| Increment | 1 | 1 | 2 | 2 |
| Decrement | 1 | 1 | 1 | 1 |

As shown in table 5, the IQ and SQ increase or decrease by 1, however, the HQ and EQ increase by 2 and decrease by 1.

The character can sojourn in several different states with different character images and text expressions. The state description information defines quotient range for a state with state determination data as shown in table 6. The character is presented with an expression listed in table 6 and an emotion selected from the table 7 in which various emotional expressions are described in association with the character quotients. That is, table 6 defines how to present a character image corresponding to the character state. However, the character can be presented with one of a plurality of emotions in a state. Table 7 shows resources (image, sound, text, etc.) reflecting the emotions.

TABLE 6

| State index | 00 | | | |
|---|---|---|---|---|
| Description | Stupid state (misunderstand and speak foolish word) | | | |
| Sound effect | Hehehe . . . , foolish laughing sound (sound#1.wav) | | | |
| | SQ | HQ | IQ | EQ |
| Quotient | Minimum 450 | 500 | 500 | 450 |
| | Text | | Image (file name) | |
| | What Happened? | | 0001_01_00.gif | |

TABLE 7

| State index | 00 | | | |
|---|---|---|---|---|
| Description | Stupid state (misunderstand and speak foolish word) | | | |
| Sound effect | Hehehe . . . , foolish laughing sound (sound#1.wav) | | | |
| | SQ | HQ | IQ | EQ |
| Quotient | Minimum 450 | 500 | 500 | 450 |
| Emotion Description | Type | Text | | Image (file name) |
| | Happy | I am happy enough | | 0001_01_01.gif |
| | Normal | Mwwwooooo-hah-hah . . . | | 0001_01_02.gif |
| | Angry | What . . . what | | 0001_01_03.gif |
| | Sad | Sob sob | | 0001_01_04.gif |
| | Tired | The sandman's comming | | 0001_01_05.gif |

The state expression can be implemented in various manners. In this embodiment, a growth state transition model, transformation state transition model, and combination state transition model combining the growth state transition model and transformation state transition model are used. The state transition models can be expressed according to the state description information of table 6 together with the character images linked to the table 6. In this case, the emotion of the character can be ignored. The state transition models also can be expressed together with multiple emotion models as shown in the table 7. That is, a single state transition model can be implemented with multiple emotion models, each emotion model including several kinds of emotions, text expressions, and character images. When presenting the state transition model, one of the emotion models is selected. In this embodiment, a character represents a state transition model, which may reflect one of the emotion models belonging to the state transition model.

The state transition models are described hereinafter with reference to the accompanying drawings.

In the mobile phone having a character system according to an embodiment of the present invention, a character selected in the character system can be presented with various characteristics while growing up in accordance with the state transition model. A state means a stage which the character goes through while growing up such that the character grows up to be a final state through several intermediate states. In the case of the growth state transition model, the state includes an infant state, puerility, juvenile, and adult states. In the case of transformation state transition model, the state includes lazy and smart states. A character expression can be presented in conjunction with various states, which called as a state set. The state set includes intermediate state set (called a growth state set), a final state set (called transformation state set), and a state set combining the two kinds of state set (called a combination state set).

Figure 3B:
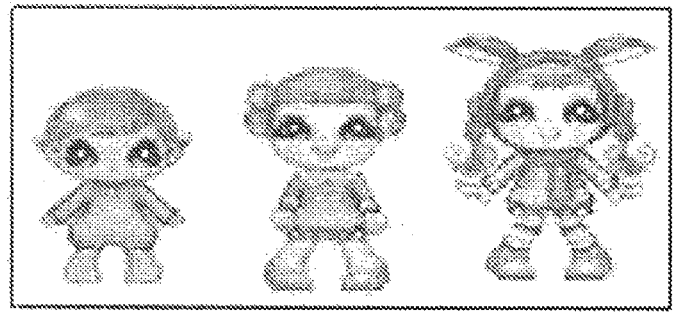
FIG. 3 is a drawing illustrating transformation states of a character according to an exemplary embodiment of the present invention.

FIG. 3a is a drawing illustrating a character in different states of a transformation state set of the screen image presentation method according to an embodiment of the present invention, and FIG. 3b is a drawing illustrating an exemplary character in different states of a growth state set of the screen image presentation method according to an embodiment of the present invention.

In the mobile phone employing the character system according to an embodiment of the present invention, a character description scripter can be provided as a record of the tables 6 and 7. The states are defined differently by character (a number of states and titles of the states). Each character may have a plurality of states and different voice effects for respective states. The voice effects can be simply expressed (for example, crying sound, laughing sound, and the like). Each character can be implemented to express a plurality of emotions. In the case that the table 7 is adopted, the character can express five emotions at a single state. This means that each state can be supported by different emotion models. The state transition of the character can be determined on the basis of the character quotients. The character can be implemented so as to be animated or to highlight the state transition, when the character transits from a state to another.

Figure 3D:
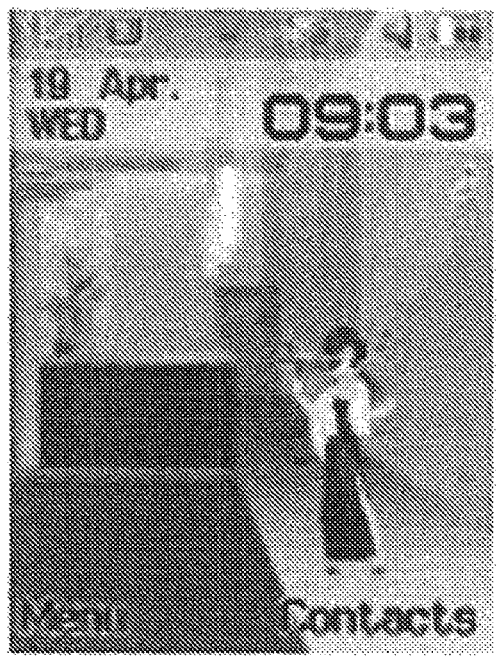
Figure 3D:
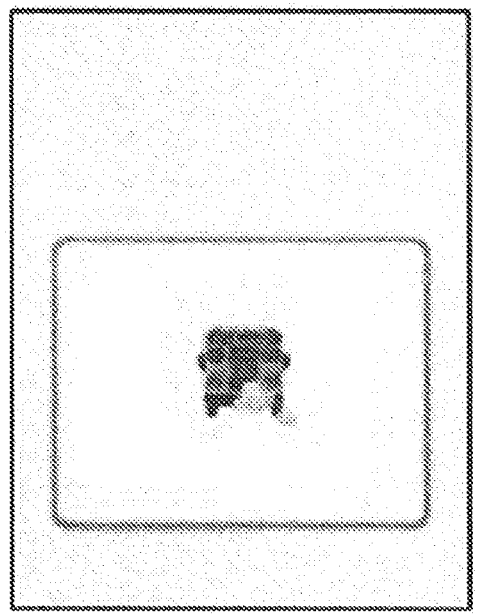
Figure 3D:
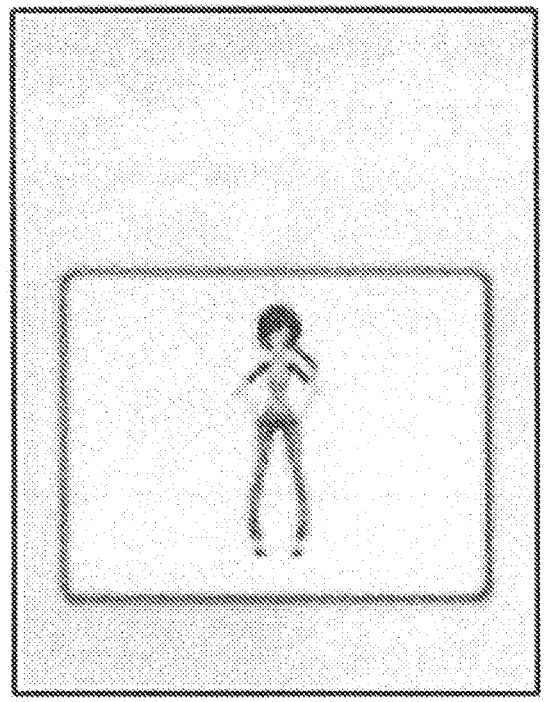
Figure 3D:
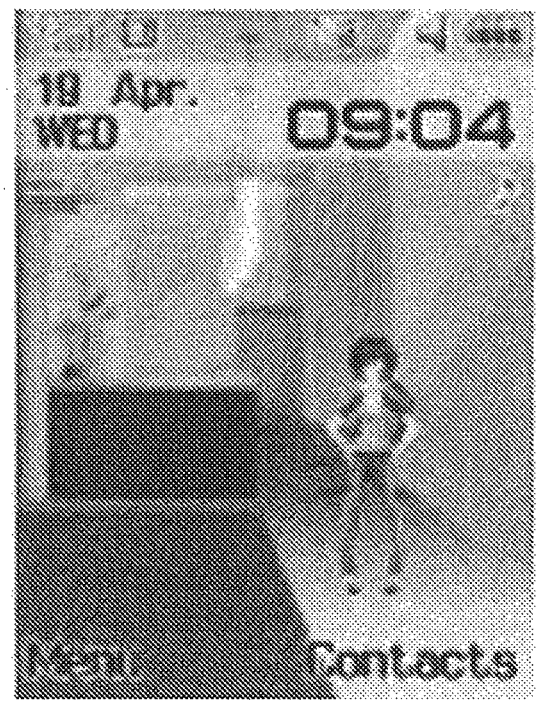

FIGS. 3c and 3d are drawings illustrating state transitions of characters in a screen image presentation method according to an embodiment of the present invention.

In FIG. 3c, each character transits from a lazy state to a smart state. The state transition is performed with a state transit animation such that the state transit animation is presented between the lazy state and the smart state for emphasizing the state transition.

In FIGS. 3da to 3dd, a character transits from a party girl state (see FIG. 3da) to a school girl state (see FIG. 3dd). The state transition is performed with two intermediate animations such that two transit animations (see FIGS. 3db and 3dc) are sequentially presented between the party girl state and the school girl state. The first intermediate animation presents a school bus, and the second intermediate animation presents a school girl preview.

State transition models are described hereinafter with reference to the drawings. As described above, the state transition can be occurred in accordance with the variations of the character quotients. The state transition model defines the character presentation, transition order, and transition threshold. The state transition model includes a growth state transition model, transformation state transition model, and combination state transition model combining the growth and transformation state transition models. The growth and transformation state transition models are explained in more detail. Table 8 shows differences between the growth state transition model and the transformation state transition model.

TABLE 8

|  | Growth state transition | Transformation state transition |
| --- | --- | --- |
| Additional information for determining state transition | Quotient range per state | Weights assigned to quotients per character |
| Transition order | S0?S1?S2 . . . ?Sn | Transit among states without order |

How to determine a state transition of a character is described. The state transition is performed by a character quotient update module. The character quotient update module reflects weights to the character quotients as shown in table 5. Following the execution of the character quotient update module, a state transition determination module is executed. The state transition is carried out in different schemes according to the state transition models of the character. Accordingly, the elements constituting the state transition determination module have different values and rules in accordance with the state transition model. Commonly required elements of the state transition determination module are structured as shown in FIG. 4.

Figure 4:
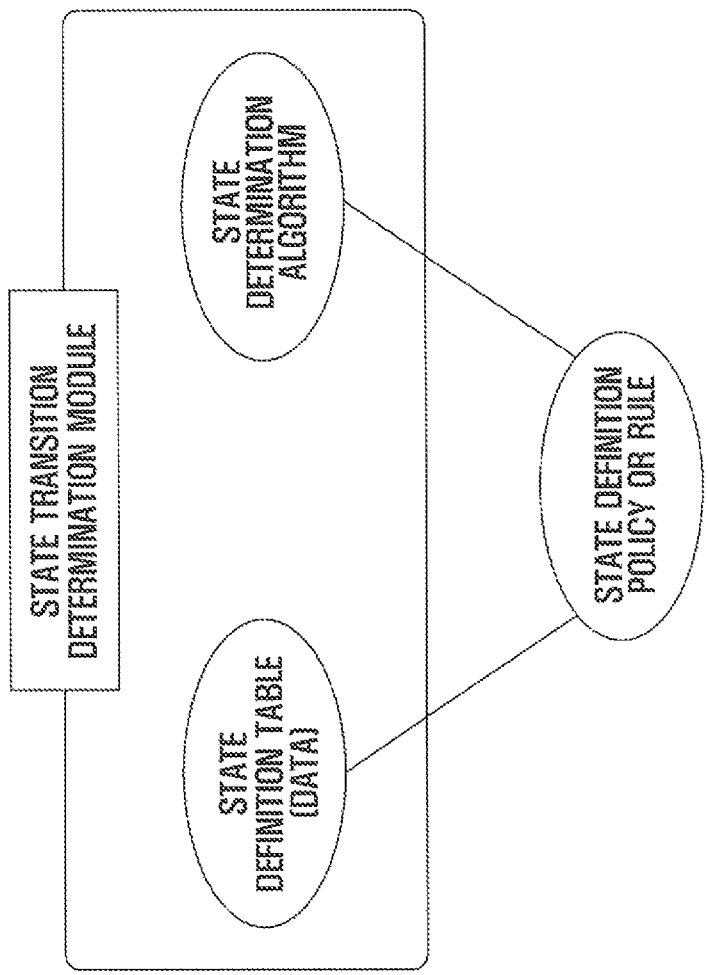
FIG. 4 is a diagram illustrating a configuration of a state transition determination module of a character system of a mobile phone according to an embodiment of the present invention.

FIG. 4 is a diagram illustrating a configuration of a state transition determination module of a character system of a mobile phone according to an embodiment of the present invention.

Referring to FIG. 4, a state determination algorithm and a state definition table for defining states for use in the state determination algorithm is required for determining whether to transit the state of the character. The state definition table includes data values for distinguishing the states from each other. The state definition algorithm determines a target state with reference to the state definition table. Each record value of the state definition table includes state definition scheme and rules by state transition model. The rule enables the state determination algorithm to operate without errors.

As described above, the state transition model includes a growth state transition model, transformation state transition model, and combination state transition model combining the growth and transformation state transition models. The growth and transformation state transition models are explained in more detail.

Figure 5:
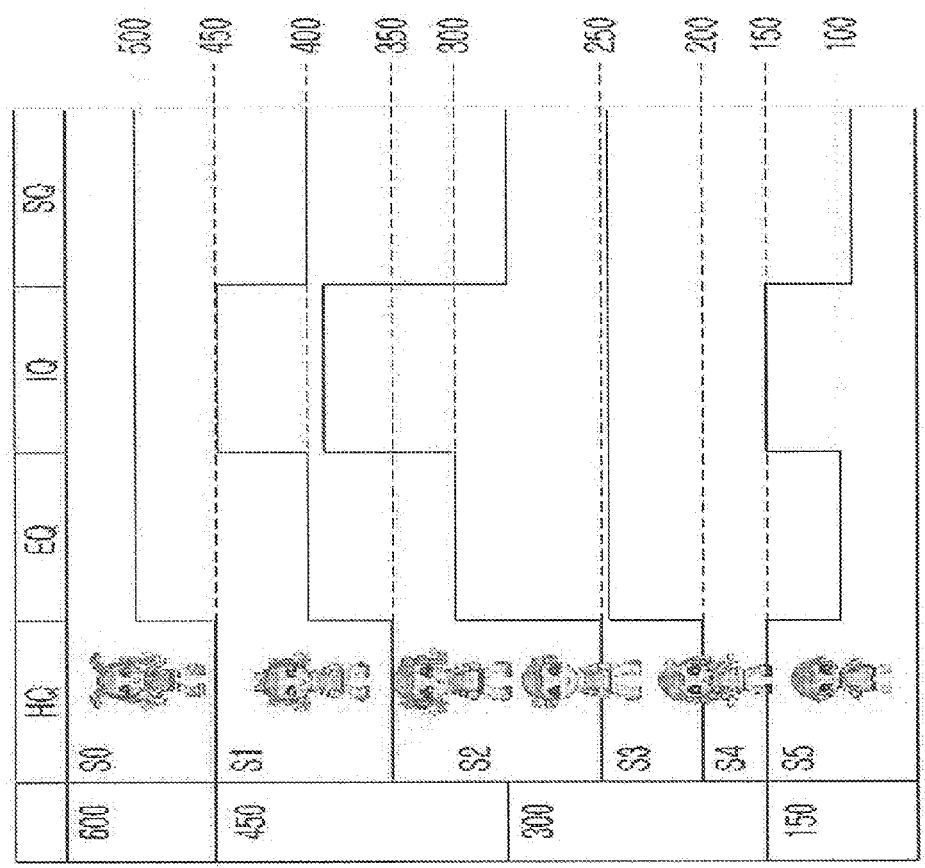
FIG. 5 is a diagram illustrating a growth state transition model of a character system according to an embodiment of the present invention.

First, the growth state transition model is described in more detail. FIG. 5 is a diagram illustrating a growth state transition model of a character system according to an embodiment of the present invention. As shown in FIG. 5, the growth state transition model consists of 6 growing steps. Of course, a number of steps can be changed.

In order to define the states of the growth state transition model, character quotient ranges for each step should be determined. Maximal values of the quotients are identical at each step. Accordingly, the quotient ranges can be defined with minimal values of the quotients. The quotient ranges can be defined in accordance with the following rule. If it is assumed that the growth states are S0 to Sn, a number of the states is n+1. S0 is a final growth state and Sn is an initial growth state. Between the final growth state S0 and the initial growth state Sn, several intermediate states exist. The less the value of n is, the higher the state is. If H(n) is a minimal value of the HQ in Sn state, S(n) is a minimal value of the SQ in Sn state, I(n) is a minimal value of the IQ in Sn state, and E(n) is a minimal value of the EQ in Sn state, $H(n)=I(n)=S(n)=E(n)=0$.

$$H(0)=H(1)=H(2)=H(3)\ldots=H(n-1)=H(n)$$

$$I(0)=I(1)=I(2)=I(3)\ldots=I(n-1)=I(n)$$

$$S(0)=S(1)=S(2)=S(3)\ldots=S(n-1)=S(n)$$

$$E(0)=E(1)=E(2)=E(3)=E(n-1)=E(n)$$

If the states are defined in this manner, the state definition table of the growth character description script can be presented as table 9. Table 9 shows the character description script at the final growth step. Such character description script includes values corresponding to the states at each growth step.

TABLE 9

| State index | 00 |
|---|---|
| Description | Final growth step (splendid grown-up having charisma) |
| Sound Effect | Broad laugh (sound#00.wav) |

| | Quotient | | | |
|---|---|---|---|---|
| | SQ | HQ | IQ | EQ |
| Range Minimum | 300 | 500 | 400 | 450 |

In growth state transition model, the state transition can be determined as follows. The state determination algorithm determines whether current values of the character quotients are in the quotient ranges at each growth step, by comparing the current quotient values with the quotient ranges. The comparison is performed from a low growth step to a high growth step.

Figure 6B:
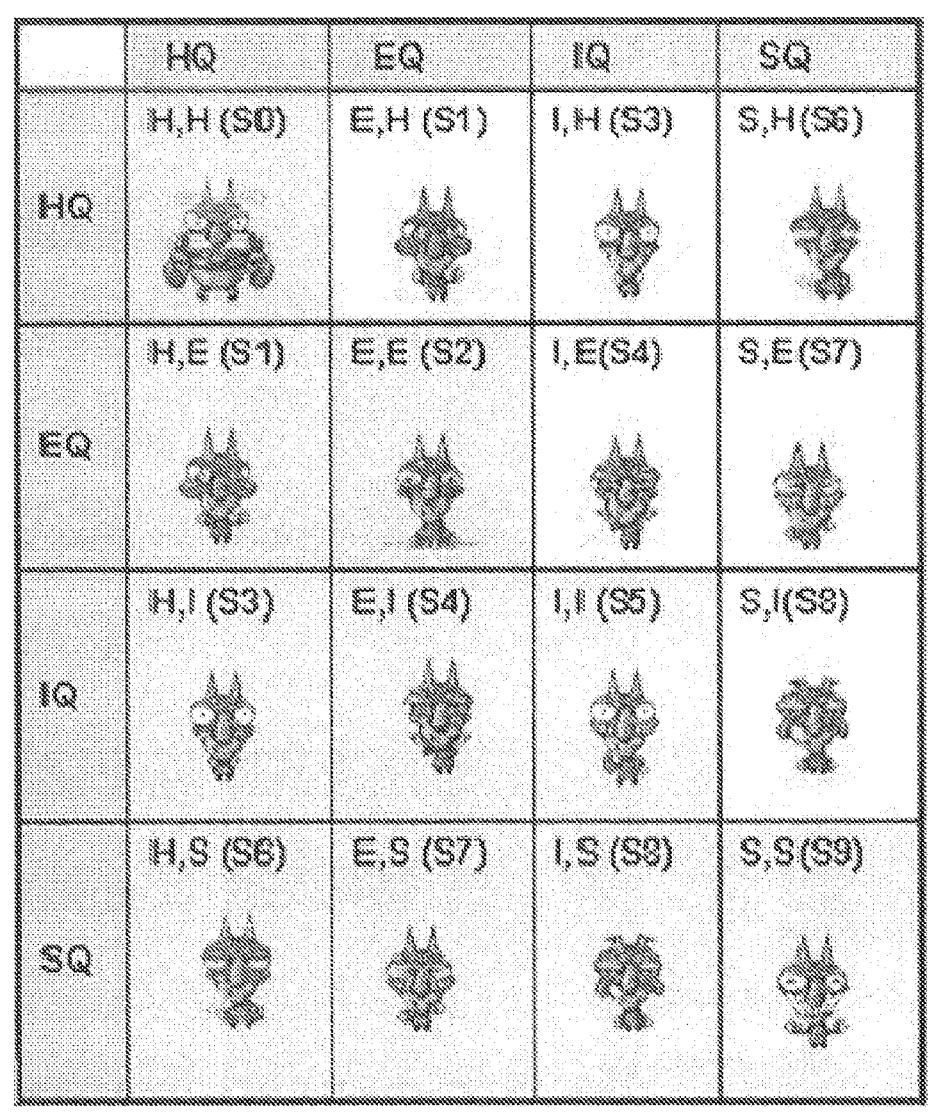

Second, the transformation state transition model is described in more detail. FIGS. 6a to 6c are drawings illustrating transformation state transition model of a character system according to an embodiment of the present invention.

In FIG. 6a, the character state is presented in association with a single character quotient. In FIG. 6b, the character state is presented in association with at two character quotients.

Referring to FIG. 6a, a character state, in the transformation state transition model, is determined by a specific character quotient value without any quotient range. In this embodiment, the SQ, EQ, IQ, and HQ are used for determining the character state. In this case, if a specific quotient exceeds a threshold value, the character system performs a state transition. For example, if the SQ exceeds a threshold value, the character is expressed in a sociable state as shown in FIG. 6aa. If the EQ exceeds a threshold value, the character is expressed in an emotional state as shown in FIG. 6ab. If the IQ exceeds a threshold value, the character is expressed in an intelligent state as shown in FIG. 6ac. If the HQ exceeds a threshold value, the character is expressed in a physically robust sate as shown in FIG. 6ad. The character can be replaced by another, and each character can be presented in another expression.

Referring to FIG. 6b, the character state is presented in association with two of the four character quotients. Accordingly, various character states can be obtained.

As shown in FIG. 6b, the transformation state of the character is determined by a set of at least two quotients. In this case, a quotient set (H, H) means a physically robust state, a quotient set (H, I) means a physically robust and intelligent state, and a quotient set (E, I) means an emotional and intelligent state. The set pairs of (E, H) and (H, E), (I, H) and (H, I) and (S, H) and (H, S), (E, I) and (I, E), (E, S) and (S, E), and (I, S) and (S, I) can be regards as different state or an identical state. In this embodiment, each pair of the sets defines an identical state. In this case, ten states can be obtained. In order to implement this kind of transformation state transition model, quotient weight tables for respective characters is additionally provided. The quotient weight table reflects different weights to the quotients (HQ, IQ, EQ, and SQ) and the weights can be modified. The quotient weight can be determined in consideration of the basic personality as shown in table 2, initial quotient value as shown in table 4, and quotient increment/decrement rate as shown in table 5. The quotient weight is determined in accordance with the following three rules. First, a sum of the weights for the quotient should be a predetermined value (for example, 100). Second, there is no zero weight. Third, the weights for different quotients do not have an identical value. This is for avoiding that the quotients have the same weight. By defining the transformation state transition model, the character description script can be expressed as shown in tables 10 and 11. Table 10 shows quotient weights for the transformation state transition model, and table 11 shows state definition information for the transformation state transition model. In the case of FIG. 6b defining 10 states, 10 state definition tables like table 11 are required.

TABLE 10

| SQ | HQ | IQ | EQ |
|---|---|---|---|
| 20 | 40 | 30 | 10 |

TABLE 11

| State index | 00 |
|---|---|
| Description | Physically robust and brave state |
| Sound Effect | Broad laugh |
| Quotient Set per State | HQHQ |

How to determine a state transition is described hereinafter in detail.

In order to define the states of the transformation state transition model in the form of a state definition table per character, plural character quotients can be used. In this embodiment two character quotients are used for defining the character states as shown in FIG. 6b. In this case, the state transition determination may be used to determine a set of two character quotients.

The state transition is determined in such a manner that when one of accumulated quotients (HQ, EQ, SQ, and IQ) exceeding a predetermined threshold value (in this embodiment, 100) is determined as a first quotient. A second quotient is selected in probability calculation with reference the quotient weights table. If a quotient set is determined with the two quotients, the character state transits to the state corresponding to the quotient set. After the state transition, the first quotient is initialized to become the present value 100. This is for preventing the first quotient from being fixed in accordance with the mobile phone usage pattern.

Although a single character is presented with different expressions corresponding to the character states in FIG. 6b, different characters can be presented for different states.

In the transformation state transition model, the state transition is determined according to the mobile phone usage pattern and random elements selected by the character's characteristics.

The growth state transition model, transformation state transition model, and combination state transition model can be implemented with an emotion models.

Figure 7B:
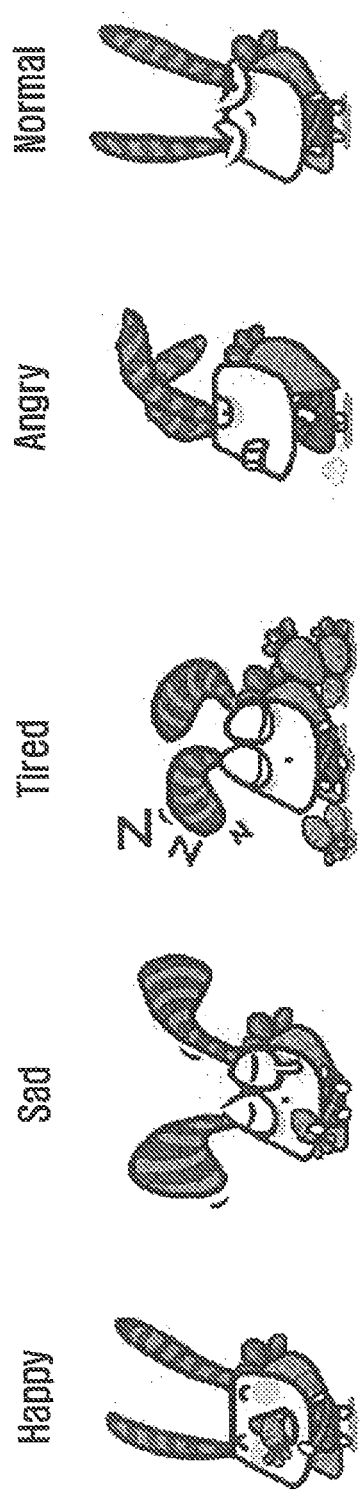
Figure 8:
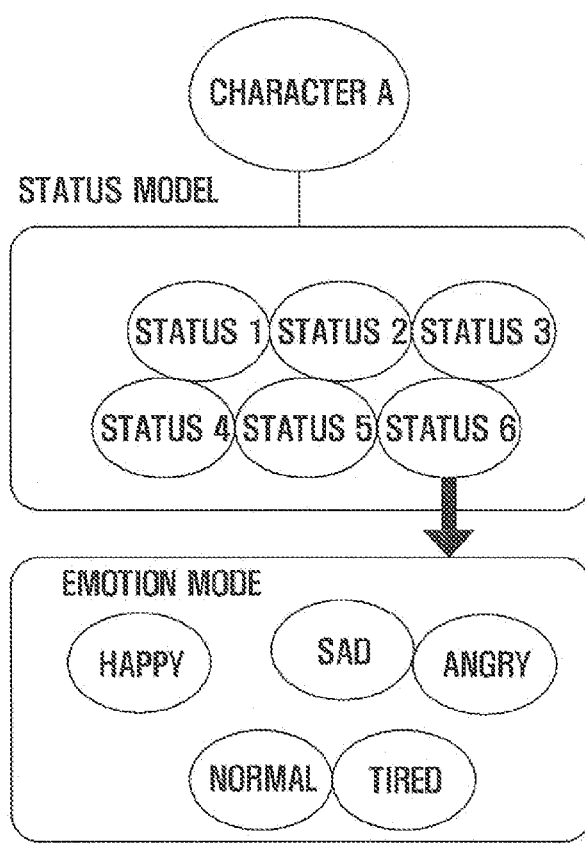
FIG. 8 is a diagram illustrating a relationship between the state transition model and the emotion model of the character system according to an embodiment of the present invention.

FIGS. 7a and 7b are drawings illustrating exemplary emotion models of a character system according to an embodiment of the present invention, and FIG. 8 is a diagram illustrating a relationship between the state transition model and the emotion model of the character system according to an embodiment of the present invention.

As shown in FIGS. 7a to 7b, an emotion model includes 5 emotion expressions: happy, normal, sad, tired, and angry. Each character (for example, character A) can express 5 different emotions at each state. That is, the character A has 6 states (S0 to S5) and each state can be presented with 5 emotions, as shown in FIG. 8. In this case, the emotion model is dependent on the state transition models.

The emotions of the emotion model can be presented in the form of animation and text expressions. These expression elements can be changed according to the state of the character. The animations and texts corresponding to the emotions per character state are defined in the character description script. The emotion model can be defined as shown in the form of table 7 in which the emotion expression information is included.

The emotion model is reflected while presenting the character in a specific state. The emotion model can be determined according to the usage pattern of the mobile phone. The emotion model can be selected on the basis of the character quotients by the user.

The character quotients-based emotion model determination is described hereinafter. Table 12 shows the kinds and meanings of the character quotients.

TABLE 12

|   | Meaning | Class | Quotient-related event |
|---|---------|-------|------------------------|
| 1 | Kindness | SQ | Scheduler, Phonebook, Call, Message, E-mail, Anniversary, To-do |
| 2 | Sensibility | EQ | Ring bell, Theme, Memory, Battery, Anniversary, Music, Broadcast |
| 3 | Intelligence | IQ | Help, Phonebook, Scheduler, To-do, Application execution |
| 4 | Physical Robustness | HQ | Memory, Battery, Calling time, Radio condition, Idle state |

As shown in table 12, four character quotients are used according to an embodiment of the present invention and each quotient increases and decreases according to mobile phone-triggered events and user-triggered events. The character quotients are reflected to the characters with different weights.

The events influencing to the character quotients can be classified into two categories. The first category includes the events occurred for general uses of the mobile phone, and the second category includes the events related to the character system for providing the user with convenience. The character quotients concerned with the general usage events and the character system events can be listed in relation with the character quotients as shown in table 13.

TABLE 13

| | Character quotients | | | |
|---|---|---|---|---|
| Event | SQ | EQ | IQ | HQ |
| Call Tx | O | | | O |
| Message Tx | O | | | O |
| E-mail Tx | O | | | O |
| Call Rx | O | | | O |
| Message Rx | O | | | O |
| E-mail Rx | O | | | O |
| Scheduler | O | | O | |
| Phonebook | O | | O | |
| To-do | O | | O | |
| Anniversary | | O | | |
| Ring Bell | | O | | |
| Theme | | O | | |
| Memory | | | | O |
| Battery | | | | O |
| Camera | | O | | |
| Camcorder | | O | | |
| Music | | O | | |
| Help | O | O | O | O |
| Application Execution | | | | O |
| Calling Time | O | O | O | O |
| Radio condition | | | | O |
| Idle state | | | | O |
| Block/Delete List Registration | | | O | |
| Read Message/Mail | O | O | O | O |
| Call/Message/Mail | O | O | O | O |
| Group Designation | O | | | |
| Usage Pattern Detection | | | O | |
| MMS Tx | O | O | O | O |
| Memo | O | O | O | O |
| Morning Call | O | | | |
| A/S for update | | | | O |
| Avatar Praise | | O | | |
| — | — | — | — | — |
| — | — | — | — | — |

If an event listed in table 13 occurs, at least one quotient associated with the event is accumulated. Each character can have information on the weights for some quotients. In this case, the character quotients increase or decrease according to the weights assigned thereto. The character system may include several characters of which quotients weights differ from one another. Accordingly, the character system updates the character quotients differently for the respective characters. Table 14 is a quotient weight table when 3 characters are used.

TABLE 14

| ID | Character | EQ+ | EQ− | IQ+ | IQ− | HQ+ | HQ− | SQ+ | SQ− |
|----|-----------|-----|-----|-----|-----|-----|-----|-----|-----|
| 0 | Trollis | 3 | 1 | 2 | 2 | 3 | 1 | 2 | 1 |
| 1 | Lucy | 2 | 2 | 2 | 2 | 2 | 2 | 3 | 1 |
| 2 | Batcat | 3 | 1 | 2 | 2 | 2 | 2 | 2 | 2 |

In table 14, "*Q+" denotes an increment amount of a quotient when an event occurs or is processed, and "*Q−" denotes a decrement amount of a quotient when an event occurs or is pressed. For example, in a case that an outgoing call event occurs and the call processing result is positive, the SQ and HQ of the character Trollis increase by 2 and 3, respectively, while the SQ and HQ of the character Lucy increase by 3 and 2, respectively. In the meantime, the SQ and HQ of the character Batcat increase by 2 and 2. Also, if the call processing result causes a decrement factor, the SQ and HQ of the character Trollis decrease respectively by 1 and 1, and the SQ and HQ of the character Lucy decrease respectively by 1 and 2, and the SQ and HQ of the character Batcat decrease by 2 and 2, respectively. Tables 15 and 16 show character quotient tables of growth and transformation state transition models with 3 characters, respectively.

TABLE 15

|   | Character | HQ | EQ | IQ | SQ |
|---|-----------|-----|-----|-----|-----|
| 0 | Trollis | 430 | 550 | 550 | 550 |
| 1 | Lucy | 200 | 300 | 400 | 500 |
| 2 | Batcat | 450 | 250 | 300 | 400 |

TABLE 16

|   | Character | HQ | EQ | IQ | SQ |
|---|-----------|-----|-----|-----|-----|
| 0 | Trollis | 50 | 110 | 80 | 70 |
| 1 | Lucy | 30 | 50 | 70 | 90 |
| 2 | Batcat | 40 | 30 | 70 | 50 |

After processing the event, the character system updates the character quotients associated to the event in the character quotient table 15 with reference to quotient weight table 14. The character quotient table can be updated such that only the quotients of the currently active character or all the quotients of the characters listed in the character quotient table are updated.

As described above, the character quotient table (table 15) lists current quotient values of the currently active character or available characters. Each character has multiple quotients such as HQ, EQ, IQ, and SQ, and other quotients can be added if required. Each character quotient can be set in a range (for example, 0~600).

In the case of the growth state transition model configured with the quotient values of table 15, the character quotients are set in a range (between 0 and 600) as shown in FIG. 5. When using the growth state transition model, if the minimal values of the character quotients are HQmin=500, EQmin=500, IQmin=500, and SQmin=500, the character is in the final growth state S0. If the character quotients are HQmin=350, EQmin=400, IQmin=450, and SQmin=400, the character is in an intermediate growth state S1. If the character quotients are HQmin=250, EQmin=300, IQmin=400, and SQmin=300, the character is in an intermediate growth state S2. If the character quotients are HQmin=200, EQmin=250, IQmin=250, and SQmin=250, the character is in an intermediate growth state S3. If the character quotients are HQmin=150, EQmin=100, IQmin=150, and SQmin=100, the character is in an intermediate growth state S4. Finally, if the character quotients are HQmin=0, EQmin=0, IQmin=0, and SQmin=0, the character is in an initial growth state. In this embodiment, the growth state transition occurs when all quotients exceed the minimal quotient values. For example, the character Trollis has the minimal values of the character quotients are HQmin=430, EQmin=550, IQmin=550, and SQmin=550 in table 15. In this case, since the HQ is not equal to or greater than HQmin=450, the character is in the state S1 rather than S0.

In the case of transformation state transition model, the state transition occurs when a specific quotient exceeds a threshold value. In this embodiment, the threshold value is 100. For example, since the character Trollis has an EQ greater than 100 as shown in table 16, the state transition occurs. The state transition is performed with reference to two character quotients in the transformation state transition model. The first quotient is selected when the quotient exceeds the threshold value (in this embodiment, 100), and second quotient is randomly selected. After the state transition is complete, the first quotient decreases from 110 to 100 for preventing the character from remaining in one state. When more than one quotient are greater the threshold value, the greatest one becomes the first quotient.

Whenever reflecting the quotient values corresponding to the events listed in table 13, the state transition may occur. In this case, the character quotient may be maintained or initialized after the state transition occurs according to the user's configuration. It can be considered that the quotients increase or decrease differently by character when the quotient is initialized or changed reflecting the characteristic of the character to the quotient value. The character has assigned unique character quotients that are defined in the character story. Accordingly, if the character quotients are initialized, all the quotient values are set to initial quotient values. When the currently active character is replaced by another, the character quotients may be reset to predetermined values (for example, 100).

The character quotients can vary by an action obtaining items related to the character. The items can be bought by paying the character money, which may be obtained while doing a game. The items can be classified into character-related items, character house related items, and system-related items. The character-related items can be used when the quotient variation in accordance with the normal operation of the character system (i.e., event-driven quotient variation) is felt boring or the balance between the quotients is broken. The items can be items for changing the quotient values of the character and items for changing the state of the character. The quotient-related items have function to increase the quotient values, and the state-related items have function to maintain a specific state during a predetermined time. The quotient-related items include a specific quotient-related item for increasing specific quotient by a predetermined amount and a general quotient-related item for increasing all of the quotients by predetermined amount. The state-related items include items for maintaining the character in a specific state selected by the user during a predetermined time. The character-related items are consumable so as to be expired in a predetermined time. The character-related items can be shared by characters even when the currently active character is replaced by another one. Table 17 shows the quotient-related items and state related items of the characters.

TABLE 17

| Item | name | Image | Description | Buy/sell |
|------|------|-------|-------------|----------|
| Quotient-related items | Liquid medicine (A-small) |  | Increase a specific quotient by 10 | 1000/500 |
|  | Liquid medicine (A-large) |  | Increase a specific quotient by 30 | 2500/1500 |

TABLE 17-continued

| Item | name | Image | Description | Buy/sell |
|---|---|---|---|---|
| | Liquid medicine (B-small) | | Increase every quotient by 10 | 3000/2000 |
| | Liquid medicine (B-large) | | Increase every quotient by 30 | 8000/6000 |
| State-related items | Transformation medicine | | Maintain a specific state for 7 days. | 20000/13000 |

As described above, each character has a unique character story including the identity of the character, initial quotient values, and variation amounts of the quotients. Each character stays in various states according to its identity, and the state transition of the character is determined according to the quotient values of the character. The characters have different state transition patterns. In this embodiment, the state transition is performed in the growth state transition model and the transformation state transition model.

The two state transition models operate with different state decision algorithms and state quotient information. The state transition is performed with these two elements. The character can be presented in a specific state with sound and text expression, and expresses various emotions in each state. The character is assigned character quotients of which values grow up and down according to the usage pattern of the mobile phone. The character quotients include SQ, HQ, IQ, and EQ. The values of the character quotients grow up and down in accordance with the events occurred in the mobile phone and results of the agent function executions.

Figure 9:
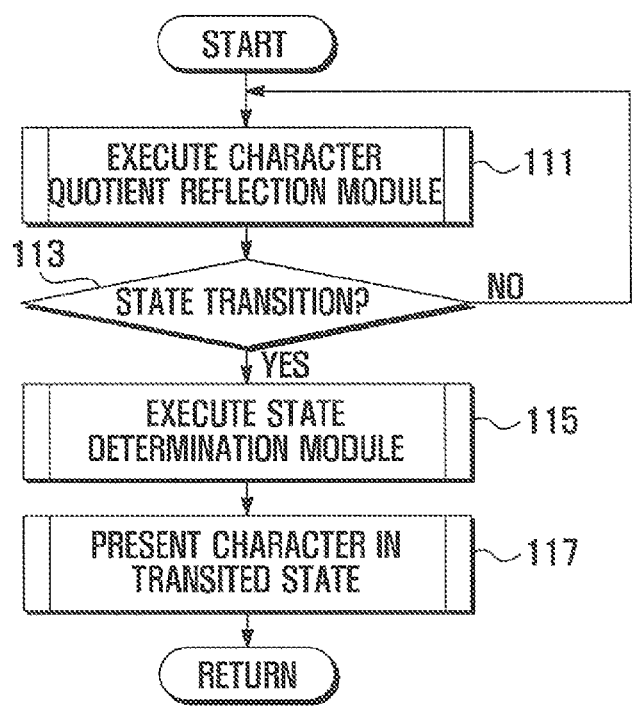
FIG. 9 is a flowchart illustrating a method for operating a character system according to an embodiment of the present invention.

FIG. 9 is a flowchart illustrating a method for operating a character system according to an embodiment of the present invention.

Referring to FIG. 9, the control unit 100 of the mobile phone executes a character quotient reflection module (111) after processing events occurred in the mobile phone or presenting an agent. The character quotient reflection module updates the character quotients according to the processing results. In this embodiment, 4 character quotients listed in table 3 are used. The character quotients are associated with the events listed in table 12. The events influencing the character quotients include the events occurred in relation to the use of the mobile phone and the events related to the character system for improving user convenience. The events related to the use of the mobile phone are listed in table 13. After processing the event, the control unit 100 checks the character quotients related to the event with reference to table 13 and then builds quotient weight tables per character like table 14. The quotient weights are set by character.

As described above, the control unit 100 processes, if an event occurs, the event, checks the character quotients corresponding to the event with reference to the character quotient table like table 13 by executing the character quotient reflection module, and determines quotient weights of the character with reference to the quotient weight table like table 14, and updates the character quotient table of the corresponding character like table 15. The control unit 100 determines the character quotients related to the event processed by means of the character quotient reflection module, determines the weights corresponding to the quotients, and then accumulates the quotient values with reference to the quotient weights in the character quotient table like table 15.

While executing the character quotient reflection module, the control unit 100 determines whether the state transition is required with reference to the character quotient table (113). If the state transition is required, the control unit 100 executes a state transition determination module (115) and presents the character in a state determined by the state transition determination module (117). The state transition is determined in different manners according to the state transition model since the state transition determination module operates with different values and in different rules according to the state transition model. The state transition determination module has a structure of FIG. 4 and is implemented with a state transition determination algorithm and state definition table appropriate for the state transition determination algorithm, in order to determine the state transition. Each record of the state definition table includes state definition schemes and rules by state transition model, and the state transition determination algorithm checks the state of the character with reference to the state definition table. In this embodiment, a growth state transition model and a transformation state transition model are used.

The operation of the character system with the growth state transition model is described hereinafter.

FIG. 10 is a flowchart illustrating a growth state determination procedure of a method for operating a character system according to an embodiment of the present invention.

A growth state transition model defines an initial state, final state, and at least one intermediate state between the initial and final states. In order to determine a state transition, character quotients ranges for those states are required (see FIG. 5). The state transition can be taken forward or backward according to the values of the character quotients. In the growth state transition model, the ranges of the character quotients for a state can be set as shown in table 9. Accordingly, plural state definition tables should be prepared as many as the number of the states of the growth state transition model. If the growth state transition model consists of 6 states (S5 to S0) as shown in FIG. 5, six state definition tables (see table 9) are required. The state transition is decided by determining whether the quotient values accumulated in the character quotient table (see table 15) are in the quotient ranges of one of the state definition tables. Preferably, the character quotient values in the character quotient table are compared with the minimal quotient values of a state definition table for a next growth state table (forward comparison). If the character quotients values in the character quotient table are not in the quotient ranges of the next growth state table, the character quotients values are compared with the minimal quotients values of a state definition for a prior growth state table (backward comparison). That is, the state decision is performed in an order of a forward comparison and backward comparison.

Referring to FIG. 10, the control unit 100 checks the quotient values of the currently active character with reference to the character quotient table (211) and checks the current state of the character (213). Next, the control unit 100 checks the state transition model of the currently active character from a character state definition table (reads EQ-SQ(Min) and EQ-SQ(Max) as a function of character ID and state variables) (215). That is, the control unit 100 obtains quotient ranges (EQmin-SQmin, EQmax-SQmax) from the state definition table taken by the character ID and character state index. After obtaining the quotient ranges of the current state, the control unit 100 determines a next state by comparing the current quotient values with the minimal quotient values of the quotient ranges (217 to 223). That is, the control unit 100 determines whether the quotients values in the character quotient table are in the quotient ranges (EQmin-EQmax, IQmin-IQmax, HQmin-HQmax, and SQmin-SQmax) of the state definition table for the next state. If it is determined that the quotients values are in the quotient ranges through the comparison steps 217 to 223, the control unit 100 maintains the current state (227).

If it is determined that at least one of the quotient values is not in the quotient ranges, the control unit 100 determines state transition to the next state (225) and repeats the step 215.

At step 225, the next state is determined in such a manner that if the at least one of the values of the character quotients (EQ, IQ, HQ, and SQ) is less than the minimal value of the corresponding character quotient (EQmin, IQmin, HQmin, or SQmin) through steps 217 to 223, a growth state right before the current state is selected as the next state. On the other hand, if it is determined that all the character quotient values are greater than the maximum quotient values (EQmax, IQmax, HQmax, and SQmax) through steps 217 to 223, the growth state right after the current state is selected as the next state.

Figure 12:
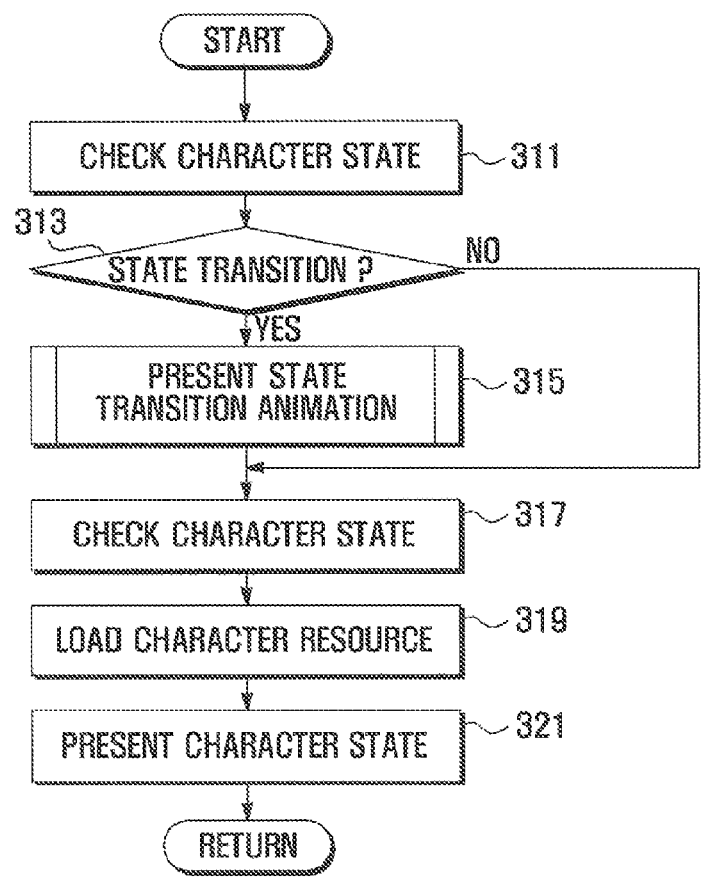
FIG. 12 is a flowchart illustrating a character state presentation procedure of FIG. 9 in detail.

If the next state is determined, the control unit 100 presents the character with the expression corresponding to the determined state at step 117 of FIG. 9 through a procedure of FIG. 12.

The operation of the character system with the transformation state transition model is described hereinafter.

FIG. 11 is a flowchart illustrating a transformation state determination procedure of a method for operating a character system according to an embodiment of the present invention.

A transformation state transition model defines a state of the character in association with a quotient set consisting of at least one quotient value as shown in FIGS. 6a and 6b. In FIG. 6b, each state is determined with two of the four quotients and each quotient set defines a unique state. The character quotients constituting a quotient set can be selected in various ways. For example, if a specific character quotient exceeds a predetermined quotient value, the quotient set can be formed with the quotients having the first and second highest quotient values. In this embodiment, the second quotient for forming the quotient set is randomly selected. The first quotient is selected from the character quotient table (see table 15) and the second quotient is selected in consideration of the quotient weights defined in the quotient weight table (see table 11).

How to select the character quotients for the quotient set is described hereinafter. In a first quotient set configuration scheme, the first quotient is selected from the character quotient table. That is, if at least one of the character quotients (EQ, SQ, IQ, and HQ) exceeds a predetermined threshold quotient value (in this embodiment, 100), the character quotient of which value exceeds the threshold quotient value is selected as the first quotient. If there is more than one character quotients of which values exceed the threshold value, the first quotient is selected in accordance with preset priorities. In this embodiment, it is assumed that the character quotients are assigned priorities descending in an order of EQ, SQ, IQ, and HQ.

After the first quotient is selected, the second quotient is determined in consideration of the weight values of the character quotients defined in the quotient weight table (see table 10). The transformation state transition model is provided with a quotient weight table for assigning different weight to the character quotients (EQ, SQ, IQ, and HQ). The quotient weight table can be configured in consideration of basic personality in table 2, initial quotient values in table 4, and the increment/decrement quantity units in table 5. The sum of the quotient weights is set to 100 and the second quotient is randomly selected by the random variable generation module.

If the two character quotients are selected, the plural states of the transformation state transition model are determined as shown in FIG. 6. There can be pairs of quotient sets of which elements are identical but different in an arrangement order. In this case, the two quotient set of each pair are identically regarded. For example, the quotient set having EQ as the first quotient and SQ as the second quotient is identical to the quotient set having SQ as the first quotient and EQ as the second quotient set.

Referring to FIG. 11, the control unit 100 checks the values of the quotients ((EQ, SQ, IQ, and HQ) of the currently active character from the quotient table (see table 16). Next, the control unit 100 determines whether the character quotients are equal to or greater than a predetermined threshold value (in this embodiment, 100) in an order of EQ, SQ, IQ, and HQ (253, 257, 261, and 265). If a quotient value is equal to or greater than the threshold value during the determination process, the control unit 100 unit selects the quotient as a first quotient of the quotient set. In the case that Trollis is the current active character, the EQ of which value is 110 (see table 16) is selected as the first quotient. If more than one quotient values are equal to or greater than the threshold, firstly checked quotient becomes the first quotient of the quotient set. In this case, the quotient selection can be performed such that the quotient of which values is highest among the quotient values equal to or greater than the threshold value.

After the first quotient is selected, the control unit 100 checks the weights assigned to the quotients with reference to the quotient weight table (see table 10) (269). Next, the control unit 100 executes a random lottery module which has win probabilities corresponding to the weights of quotients (271). Accordingly, the selection probabilities of the HQ, IQ, SQ, and EQ become 40, 30, 20, and 10, respectively. The second quotient is selected according to the number generated by the random lottery module such that SQ becomes the second quotient if the number is one between 1 and 20, HQ becomes the second quotient if the number is one between 21 and 60, IQ becomes the second quotient, if the number is one between 61 and 90, and EQ becomes the second quotient if the number is one between 91 to 100 (273).

After the first and second quotients of the quotient set are determined, the control unit 100 selects a state from the from the transformation state definition table (see FIG. 6b) according to the first and second quotients (275). If a state of the character is determined, the control unit 100 records the state (277) and decreases the first quotient valued to a preset value (in this embodiment, 100) (279). Accordingly, in table 16 the EQ value decreases from 110 to 100 by 10.

Although two quotients are used for determining a state of the character, one quotient can be used as shown in FIG. 6a. In this case, the number of states becomes identical to the number of the quotients used in the character system. Of course, the state of the character can be determined using three quotients. In this case, the third quotient can be randomly selected in the same manner for the second quotient.

Also, it is possible to select the two quotients having the highest values as the first and second quotients and randomly select the third quotient.

The states can be presented with the same character as shown in FIG. 6b or presented with different characters as shown in FIG. 6a. Consequently, the control unit 100 performs the character state presentation procedure of the step 117 in FIG. 9.

FIG. 12 is a flowchart illustrating a character state presentation procedure of FIG. 9 in detail.

Referring to FIG. 12, the control unit 100 checks the currently active character (311) and reads the character ID and name. Next, the control unit 100 determines whether the character state is changed (313). If the character state is changed (the character grows up or down in the case of the growth state transition model at step 225 of FIG. 10, or transits to another state in the case of the transformation state transition model at step 277 of FIG. 11b), the control unit presents an animation of the character (315). The state transit animation can be performed as shown in FIG. 3c or FIG. 3d. In the case of the state transit animation of FIG. 3c, the state transition is performed with an initial state animation, final state animation, and intermediate transition effect animation, of the same character. In the case of the state transition of FIG. 3d, the initial state animation character and the final state animation character differ from each other. Preferably, the intermediate transition effect animation can be an animation capable of predicting the final state animation character.

If the character state is not changed, the control unit 100 animates the currently active character.

Figure 11B:
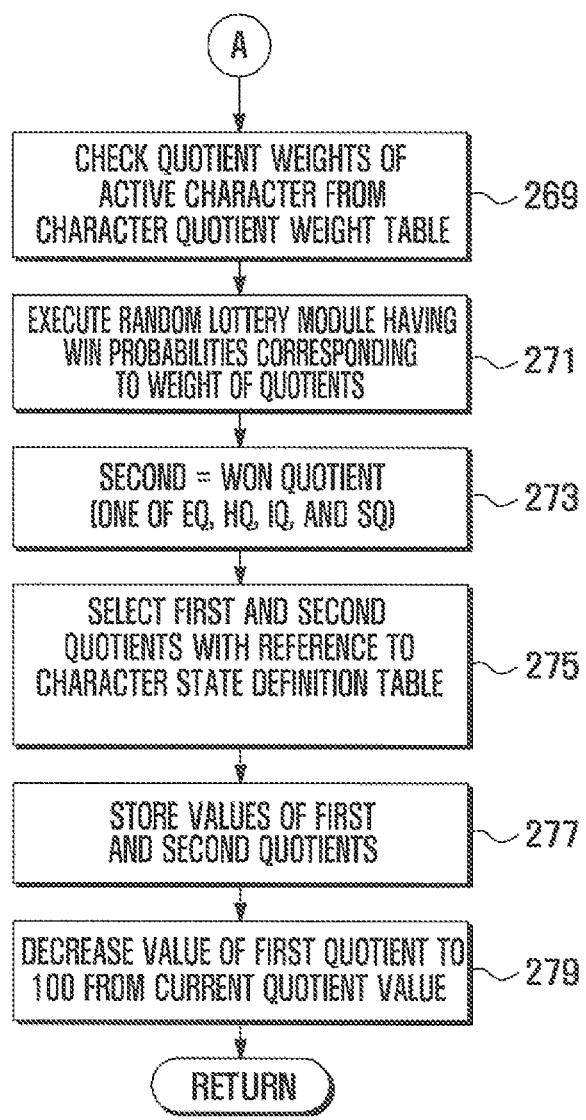
FIG. 11 is a flowchart illustrating a transformation state determination procedure of a method for operating a character system in FIG. 9.

After presenting the animation of the character, the control unit 100 checks the current state determined in the procedure of FIG. 10 or FIGS. 11a and 11b. The growth state transition model can be checked with reference to the state description information in the growth state definition table (see table 6), and the transformation state transition model can be checked with reference to the state description information in the transformation state definition table (see table 11). The state description information includes a state index, a state description, sound effect for the state, and image file name associated with the state. After checking the information on the state transition model, the control unit 100 loads the resources such as the sound, text, and image in the memory unit 23 (319) and then outputs the loaded resources through the display unit 27 and the audio processing unit 29.

Figure 13:
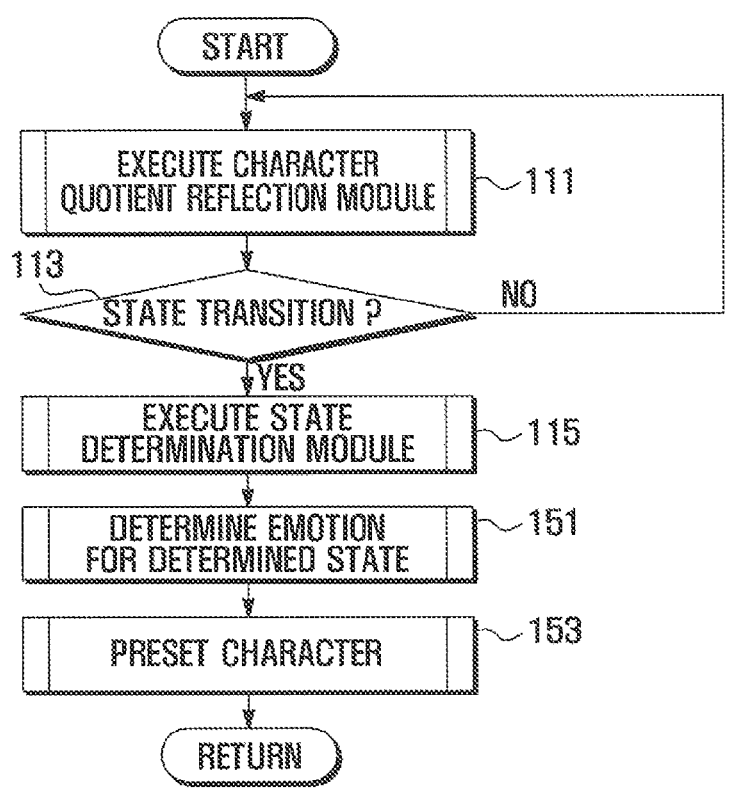
FIG. 13 is a flowchart illustrating a method for operating a character system according to another embodiment of the present invention.

FIG. 13 is a flowchart illustrating a method for operating a character system according to another embodiment of the present invention. An emotion determination procedure is further added in this embodiment. If the state transition is required while the character quotient reflection module is operating, the control unit determines a target state of the character and then determines an emotion to be expressed with the state transition model.

Referring to FIG. 13, the control unit 100 updates the character quotients according to the event-processing result while operating the character quotient reflection module (111). The state transition model determination steps 113 to 115 are identical to those in FIG. 9. The state determination is performed according to the growth state transition model and the transformation state transition model. In the case of the growth state transition model, the state determination is performed according to the procedure of FIG. 10. In the case of the transformation state transition model, the state determination is performed according to the procedure of FIG. 11.

If a state transition module is determined, the control unit 100 determines an emotion model for the state transition model. In this embodiment, the state transition model can be implemented with a plurality of emotions by state. The emotion model is implemented so as to be dependent on the state transition model. Each character can be presented in a plurality of states (6 states from S0 to S6 in FIG. 8), and each state can be expressed with a plurality of emotions (5 emotions of happy, normal, sad, tired, and angry in FIG. 8). The emotions can be expressed in animation and/or text. Different emotion models can be used for different states of the character. The text can be displayed through the display unit 27 or output through the audio processing unit 29 in verbal expression.

Figure 14:
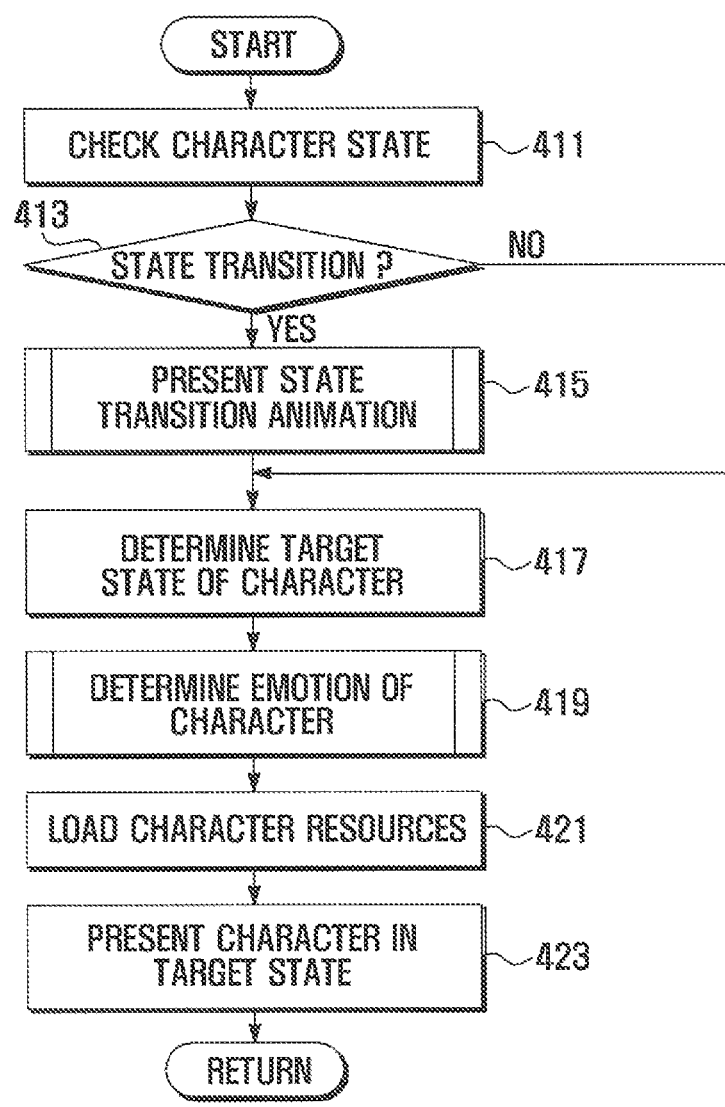
FIG. 14 is a flowchart illustrating an emotion expression procedure of FIG. 13.

FIG. 14 is a flowchart illustrating an emotion expression procedure of FIG. 13.

After the state transition model is determined, the control unit 100 checks the currently active character (411) and determines whether the state transition is decided (413). If the state transition is decided, the control unit 100 presents a state transition animation through the display unit 27 (415). Next, the control unit 100 checks the state transition model while performing the procedure of FIG. 10 or FIG. 11 (417) and then determines an emotion for the state transition model (419). The emotion determination is performed according to the procedure of FIG. 15.

Figure 15:
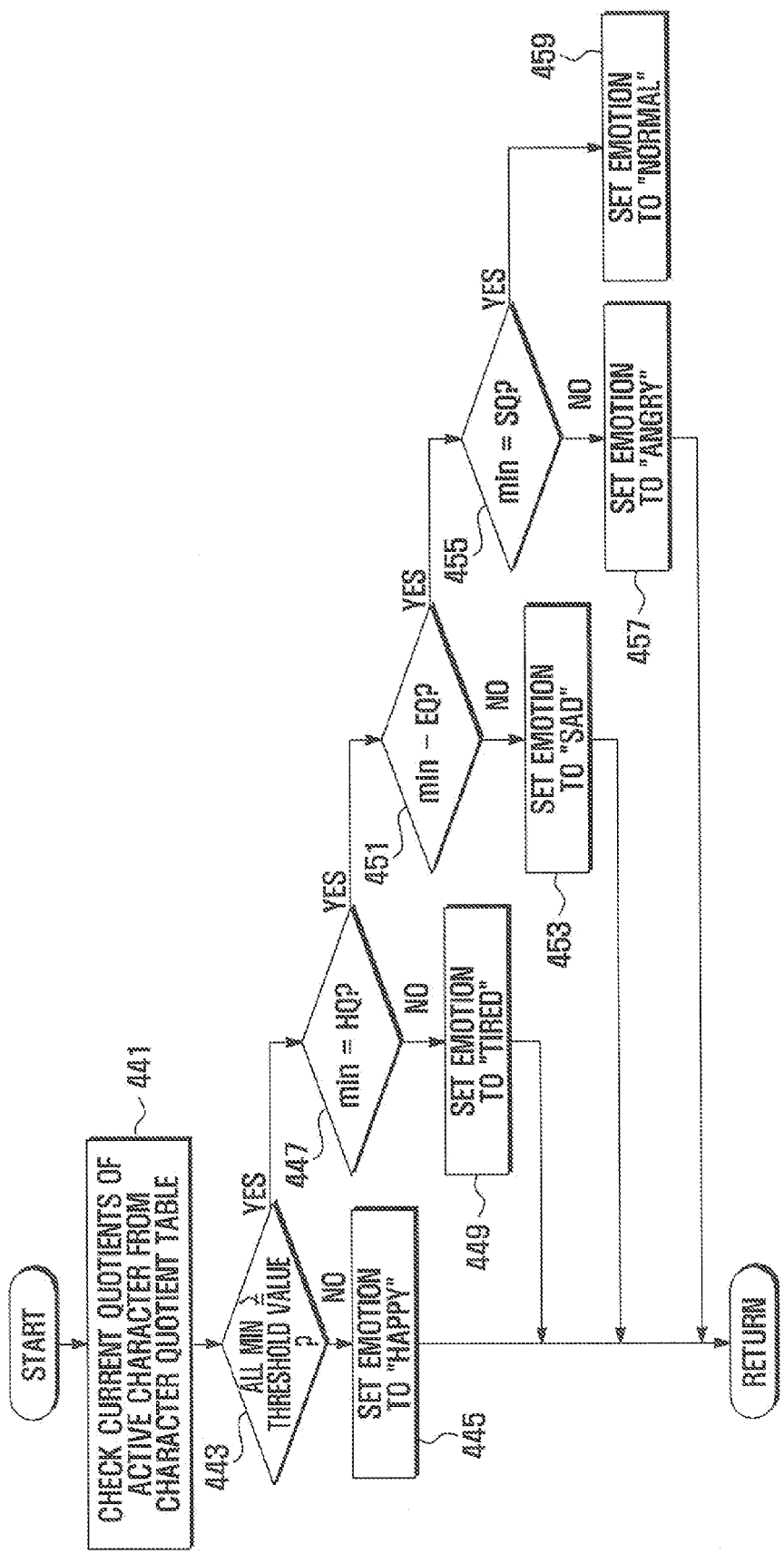
FIG. 15 is a flowchart illustrating the emotion determination procedure of FIG. 14.

FIG. 15 is a flowchart illustrating the emotion determination procedure of FIG. 14. In this embodiment, the emotion determination is performed in association with the growth state transition model.

Referring to FIG. 15, an emotion is determined according to the analysis result of individual character quotients or the entire quotients (443 to 459) after checking the quotient values of the currently active character, from the character quotient table (441). That is, in the case that minimal values of all the quotients (HQ, EQ, IQ, and SQ) are greater than a specific value, the emotion "happy" is selected. On the other hand, if the HQ has the minimal value, the emotion "tired" is selected (447 and 449). If the EQ has the minimal value, the emotion "sad" is selected (451 and 453). If the SQ has the minimal value, the emotion "angry" is selected (455 and 457). If the IQ has the minimal value, the emotion "normal" is selected (459). The minimal values of the character quotients can be changed according to the state transition model.

In the case of the transformation state transition model, the emotion for the state can be determined in a different manner from the emotion model determination procedure of FIG. 15. For example, the state determination can be performed in such a manner that the control unit 100 selects "happy" if all the values of the character quotients (HQ, EQ, IQ, SQ) are greater than 50, "tired" if the value of HQ is less than 50, "sad" if the value of EQ is less than 50, "angry" if the value of SQ is less than 50, and "normal" if all the above conditions are not satisfied.

The emotion determination can be performed in different procedure.

After the emotion of the character state is determined, the control unit 100 loads the character resources according to the state and emotion of the character at step 421 of FIG. 14. The resources are loaded according to a procedure of FIG. 16.

Figure 16:
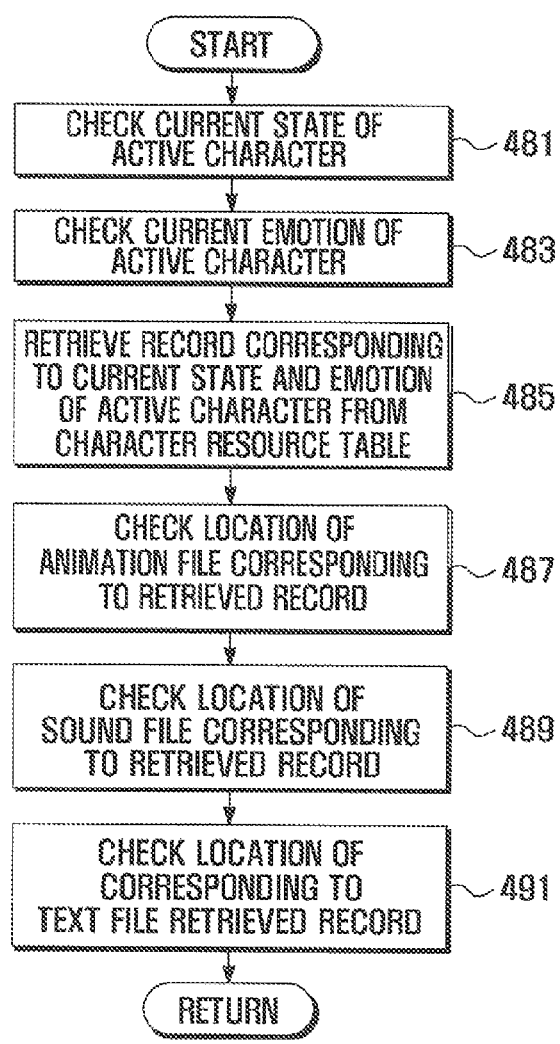
FIG. 16 is a flowchart illustrating the resource loading procedure of FIG. 14.

FIG. 16 is a flowchart illustrating the resource loading procedure of FIG. 14.

Referring to FIG. 16, after the state and emotion of the character are determined, the control unit 100 checks the character resources (481 and 483) and retrieves records corresponding to the state and emotion (487). The resources are listed in a character resource table (see table 18).

TABLE 18

| ID | Name | State | Emotion | Animation | Sound | Text |
|---|---|---|---|---|---|---|
| 0 | Trollis | 0 | 0 | 000000.img | 000000.wav | I'm very excited |
| 0 | Trollis | 0 | 1 | 000001.img | 000000.wav | Hmm, I'm fine |
| 0 | Trollis | 0 | 2 | 000002.img | 000000.wav | I'm so sad |
| 0 | Trollis | 0 | 3 | 000003.img | 000000.wav | — |
| 0 | Trollis | 0 | 4 | 000004.img | 000000.wav | — |
| 0 | Trollis | 1 | 0 | 000100.img | 000100.wav | — |
| 0 | Trollis | 1 | 1 | 000101.img | 000100.wav | — |
| 0 | Trollis | 1 | 2 | 000102.img | 000100.wav | — |
| 0 | Trollis | 1 | 3 | 000103.img | 000100.wav | — |
| 0 | Trollis | 1 | 4 | 000104.img | 000100.wav | — |
| — | — | — | — | — | — | — |
| — | — | — | — | — | — | — |
| 0 | Trollis | 9 | 0 | 000800.img | 000800.wav | — |
| 0 | Trollis | 9 | 1 | 000800.img | 000800.wav | — |
| 0 | Trollis | 9 | 2 | 000800.img | 000800.wav | — |
| 0 | Trollis | 9 | 3 | 000800.img | 000800.wav | — |
| 0 | Trollis | 9 | 4 | 000800.img | 000800.wav | — |

When a plurality of characters can be used, character resource tables are prepared for the respective characters. Table 18 is a character resource table of Trollis. In the character resource table, the state transition model includes 10 states and the emotion model includes 5 emotions. In this case, the character can express kinds of emotions per state. Accordingly, 50 cases can be presented. As shown in table 18, the sound file is changed when the state transits regardless of the emotion. However, the table can be modified such that different sound files are designated for different states and emotions.

In table 18, a single character is presented with the states and emotions. However, the multiple characters are used for presenting different states. In this case, the different character IDs and names are listed in the ID and name fields of the character resource table.

If a record having the state and emotion is retrieved from the character resource table, the control unit 100 retrieves the animation, sound, and text files matching the corresponding fields (487 to 491). If the animation, sound, and text files are retrieved, the control unit 100 presents the character with the retrieved animation, sound and text expression.

Figure 17:
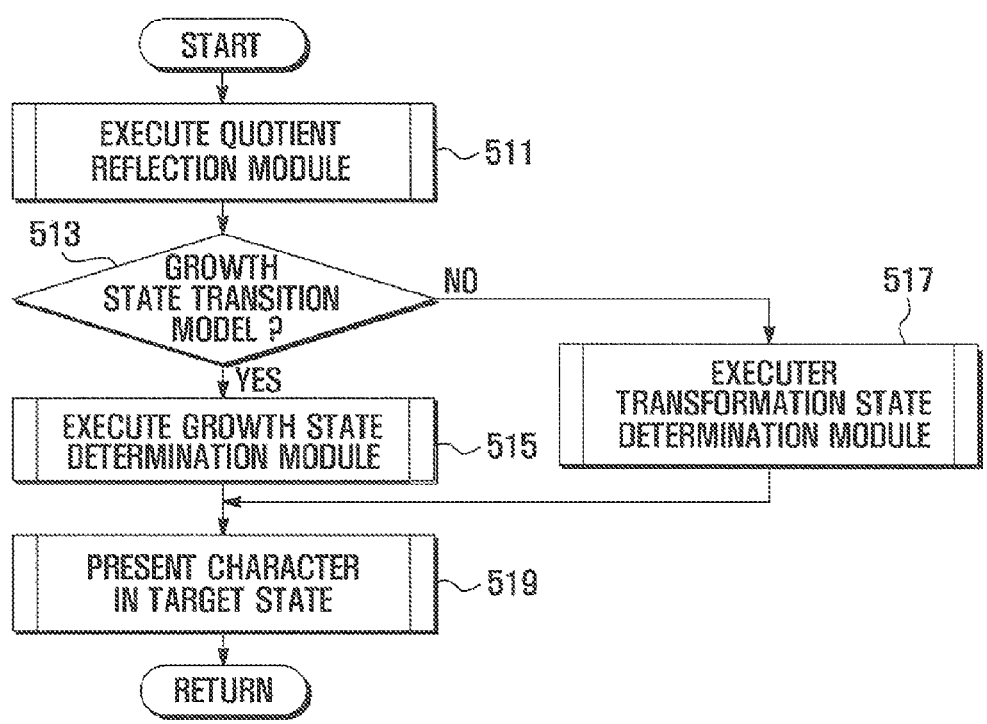
FIG. 17 is a flowchart illustrating a method for operating a character system according to another embodiment of the present invention.

In FIG. 9, the character is presented with the animation, sound, and text expressions corresponding to the state after the state determination. In FIG. 13, the character is presented with the animation, sound, and text expressions corresponding to a combination of the state and emotion of the character. The character can be presented in a growth state transition model or a transformation state transition model. In FIG. 17, the character is presented in the growth state transition model or the transformation state transition model according to the user's selection.

FIG. 17 is a flowchart illustrating a method for operating a character system according to another embodiment of the present invention. A state transition model determination procedure is further added in this embodiment.

Referring to FIG. 17, the control unit updates the character quotients according to the event-processing result while operating the character quotient reflection module (511). The operation of the character quotient reflection module is identical to those in FIGS. 9 and 13.

After updating the character quotients, the control unit 100 determines whether the state transition model of the currently active character is the growth state transition model or the transformation state transition model (513).

If the state transition model is the growth state transition model, the control unit 100 executes a growth state determination module so as to determine the growth state of the character (515). If the state transition model is the transformation state transition model, the control unit 100 executes a transformation state determination module so as to determine the transformation state of the character (517).

The growth state determination is performed according to the growth state determination procedure of FIG. 10, and the transformation state determination is performed according to the transformation state determination procedure of FIG. 11.

If the growth state of the character is determined, the control unit 100 presents the state of the character according to the state determination result (519).

At step 519, if the state transition model is not associated with an emotion model, the control unit 100 presents the character with the animation, sound, and text expressions according to the character state presentation procedure of FIG. 12. If the state transition model is associated with an emotion model, the control unit 100 presents the character with the animation, sound, and text expressions according to the procedures of FIGS. 14 to 16.

The state and emotion of the character can be determined on the basis of the values of the character quotients. The character quotients are updated by the events occurred in the mobile phone. The character quotients can be updated items associated with the character system. The items can be bought by paying character money which is obtained through an activity such as a game. The quotient related items are exemplary listed in table 17. Some items increase a specific quotient value, and the others increase all kinds of quotients values. In table 17, the items are presented as liquid medicines.

The state transition of the character is performed on the basis of the character quotients in the character system, and the character quotients increase or decrease according to the events occurred in the mobile phone. Since the occurrence frequencies of the events differ from each other, the variations of the quotients may be unbalanced. In order to compensate for the quotient variation unbalance, quotient-changing items and/or state-changing items can be used.

Figure 18:
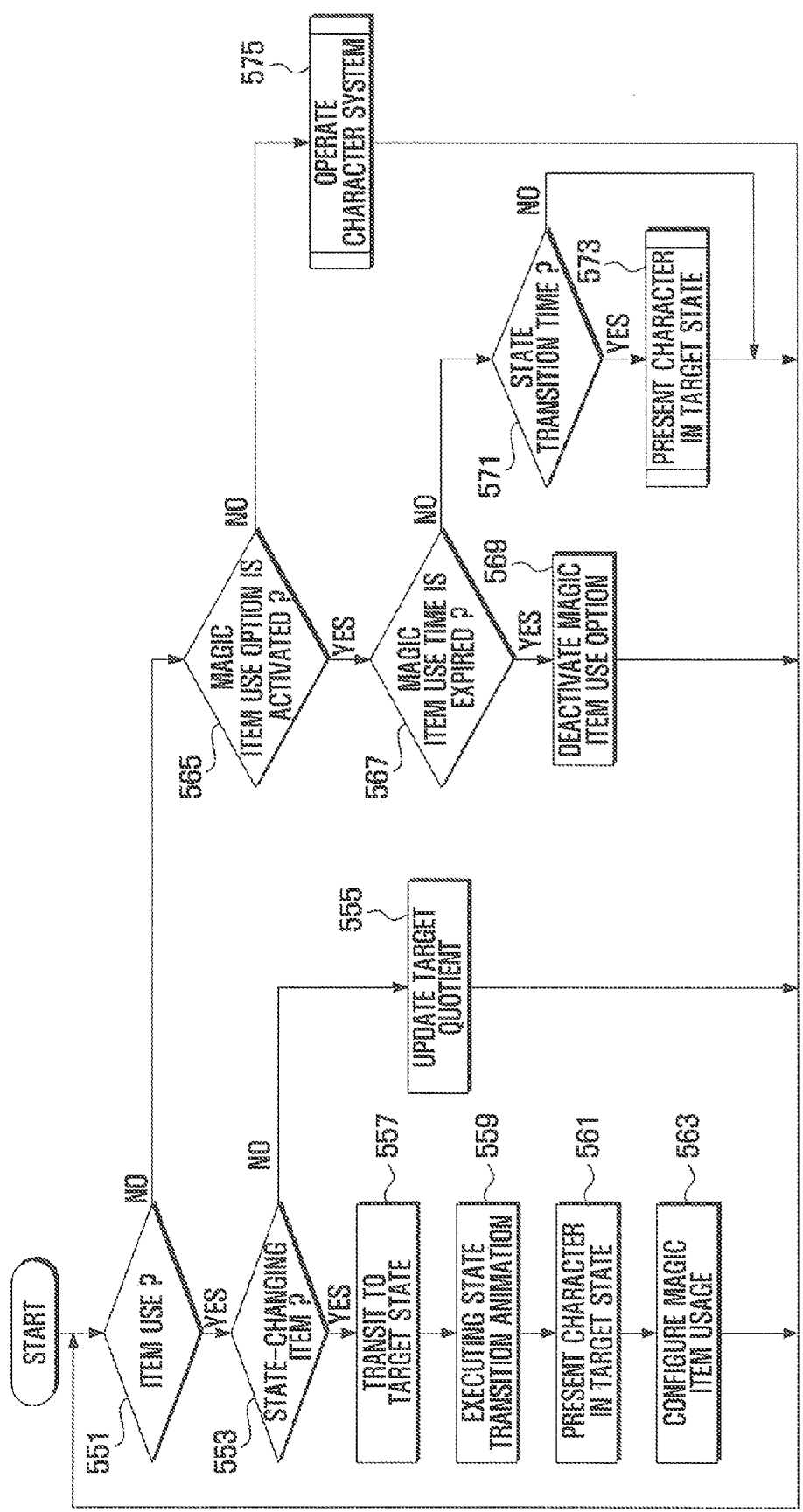
FIG. 18 is a flowchart illustrating a special item function configuration procedure of the character system according to an embodiment of the present invention.

FIG. 18 is a flowchart illustrating a special item function configuration procedure of the character system according to an embodiment of the present invention, and FIGS. 19a to 19e are screen images illustrating steps for configuring the special item function of FIG. 18.

Figure 19A:
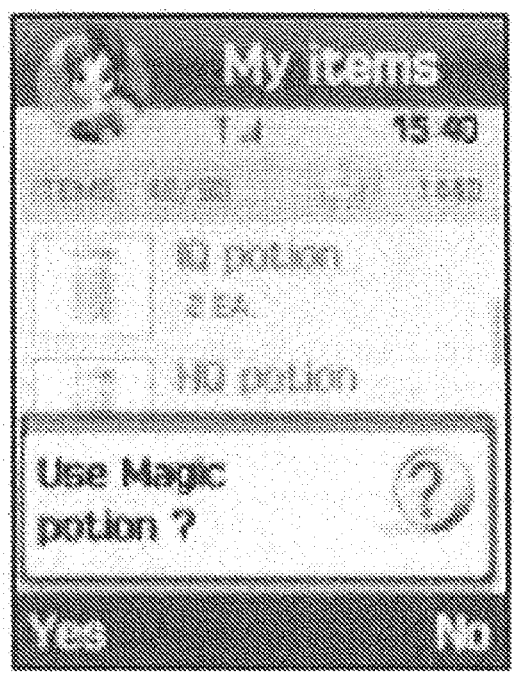
FIGS. 19a to 19e are screen images illustrating steps for configuring the special item function of FIG. 18.
Figure 19B:
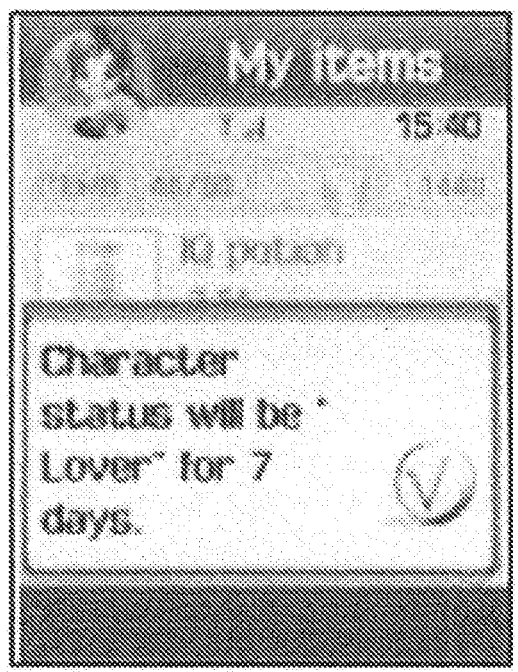
Figure 19C:
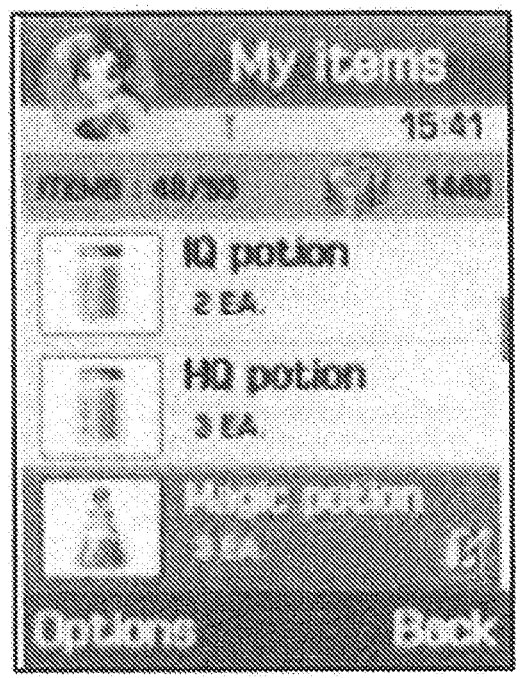

Referring to FIGS. 18 and 19a to 19e, the control unit 100 determines whether a special item function configuration request is input (551). If the special item function configuration request is input, the control unit 100 presents an option screen asking whether to use a magic item as shown in FIG. 19a. The special item includes a character-variable items and state-changing items. If a selection input is detected while the option screen of FIG. 19a is presented, the control unit 100 presents the announcement message as shown in FIG. 19b. For example, the announce message informs that the character maintains during a predetermined period (in this embodiment, seven days) if the magic item option is selected, and then shows available magic items as shown in FIG. 19c.

Figure 19D:
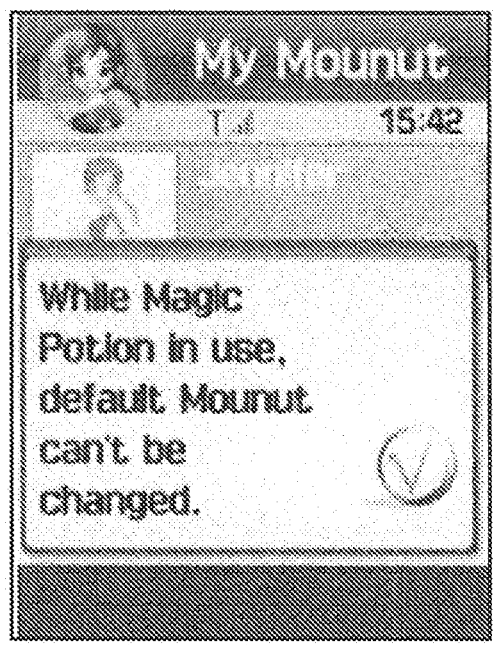
Figure 19E:
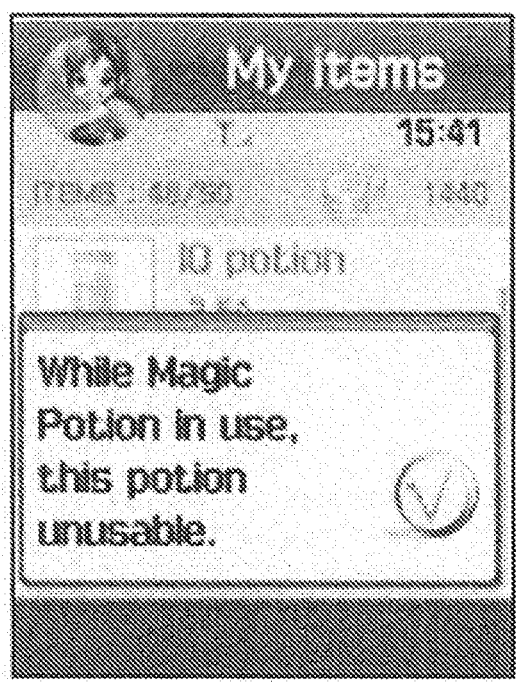

Next, the control unit 100 determines whether an item selected is a state-changing item (553) while the screen of the FIG. 19c, the control unit 100 presents the announcement message informing that the default character is not changed while using the selected item, as shown in FIG. 19d, and the announcement message information that the item cannot be used again, as shown in FIG. 19e. Next, the control unit 100 performs the state transition of the character (557). The state transition of the character can be randomly performed under the control of the control unit 100 or according to the user's request. After the state transition is complete, the control unit 100 performs a state transit animation as shown in FIG. 3*c* or FIG. 3*d* (559) presents a character determined on the basis of the changed state and/or an emotion together with the animation, sound, and text expression (561). The steps 559 and 561 can be performed according to the procedure of FIG. 12 or FIG. 14. Next, the control unit 100 sets a flag indicating the usage of the magic item and start time (563).

If the item selected at step 553 is not a state-changing item, the control unit 100 determines the item is a quotient-changing item and changes the quotients targeted by the quotient-changing item (555).

If a quotient-changing or state-changing item is selected, the control unit 100 updates the quotients and state of the character through steps 553 to 563. If a special item function configuration request is not input at step 551, the control unit 100 determines whether the magic item use option is activated (565). Whether the magic item option is activated or not can be checked by referring to the magic item usage flag. If the magic item use flag is set, the control unit determines whether the magic item use time has expired (567). If the magic item use time has not expired, the control unit 100 determines whether a state transition time is arrived (571). If the state transition time is arrived, the control unit 100 presents the character in a target state (573). The target state of the character is determined according to the function of the magic item and maintained for a magic item maintenance duration. If the state transition time is not arrived, the control unit 100 repeats the step 551. While performing the steps 571 and 573, the control unit 100 does not operate the quotient reflection module such that the event-driven quotient variation does not occur.

By repeating the above operation, the usable time of the magic item decreases to be expired. If the usable times has expired, the control unit 100 detects the expiry of the magic item at step 567 and terminates the usage of the magic item (i.e. unmark the magic item flag). In the cast the character state is changed using the magic item (state-changing item), the control unit 100 marks a flag indicating that the magic item is used and maintains the changed character state during a predetermined period (7 days in table 17). In the case that the character state is changed using the magic item the control unit 100 checks an expiry time and unmarks the flag when the usage time expires.

If the magic item usage expiration is detected, the control unit operates the character system (575). That is, the control unit performs the procedure of FIG. 9, FIG. 14, or FIG. 18 at step 575 so as to update the character quotient according to the occurring events and presents the character in a state and emotion.

In this embodiment, the character quotients are updated according to the mobile phone events and the user feedback events, and the character presentation is performed on the basis of the updated character quotients. The mobile phone events and user feedback events are processed in a procedure of FIG. 20. The mobile phone-triggered events processing procedure and the user feedback-triggered event processing procedure are described with reference to FIGS. 20 to 23. In FIGS. 20 to 23, the state and emotion presentation processes are not shown, however, the character quotient reflection module which influences the state and emotion presentation is involved.

Figure 20:
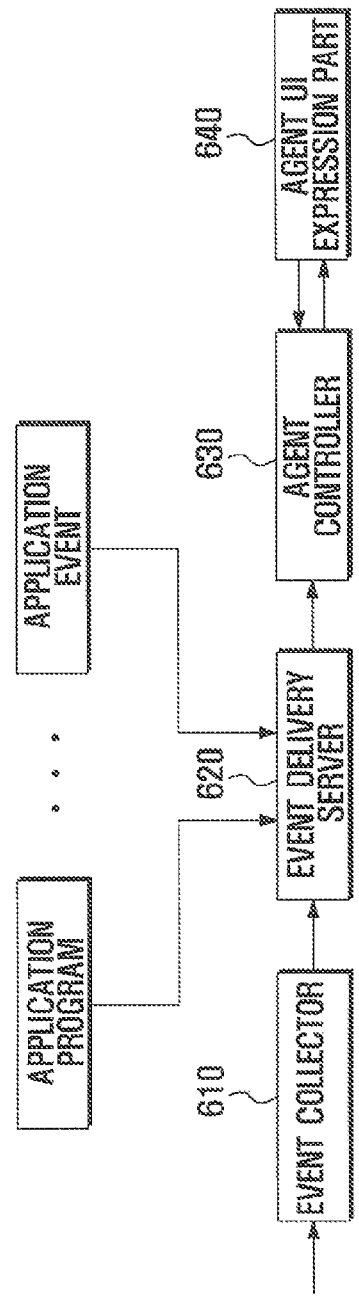
FIG. 20 is a block diagram illustrating a configuration of an agent system of a status expression system according to an embodiment of the present invention.

FIG. 20 is a block diagram illustrating a configuration of an agent system of a character agent system according to an embodiment of the present invention. The agent system can be a part of the control unit 100.

Referring to FIG. 20, the agent system includes an event collector 610, event delivery server 620, agent controller 630, and an agent user interface (UI) expression part 640.

The event collector 610 collects the events occurred in the mobile phone. The events include call processing-triggered events, internal operation-triggered events, user request-triggered events, and multimedia function-triggered events. The events collected by the event collector 610 are registered events in the mobile phone. The event collector 610 generates event messages on the basis of information associated with the occurred events and outputs the event messages to the event delivery server 620.

The event delivery server 620 delivers the event messages collected by the event collector 610 to corresponding clients. In this embodiment, it is assumed the events messages are delivered to only the agent controller 630. In a case that other elements requiring the event messages, the event messages can be delivered to those elements. The event delivery server 620 can receive delivered user-defined events that are not registered to the mobile phone to the agent controller 630. Such events are called applicant events. The applicant events are the ones occurring by game applications, web service applications, and other program applications.

Upon receiving an event message, the agent controller 630 stores the event message in an internal buffer, analyzes the event message, and determines a UI for presenting a character agent corresponding to the analysis result. The events include the mobile phone events collected by the event collector 610 and application events. From now, the agent function is described in association of the events collected by the event collector 610. The agent controller 630 includes a plurality of specialist entities and controls to select a specialist entity for performing the agent control function. If an event message is received, the agent controller 630 reports the event occurrence to the appropriate specialist entities and requests an UI to the agent UI expression part 640 for presenting the agent expression. The agent UI expression part 640 processes user feedback to corresponding event.

The agent UI expression part 640 presents the character expression corresponding to the event according the agent LII information output from the agent controller 630. The agent UI expression part 640 manages a plurality of character UI to be presented through the display unit 27, and controls to display the corresponding character according to the UI information requested by the agent controller 630. If a user feedback is input while the character is presented, the agent UI expression part 640 transmits information on the user feedback to the agent controller 630.

In the case that the events collected by the event collector 610 are processed, the event delivery server 630 can be omitted in the agent system.

Figure 21:
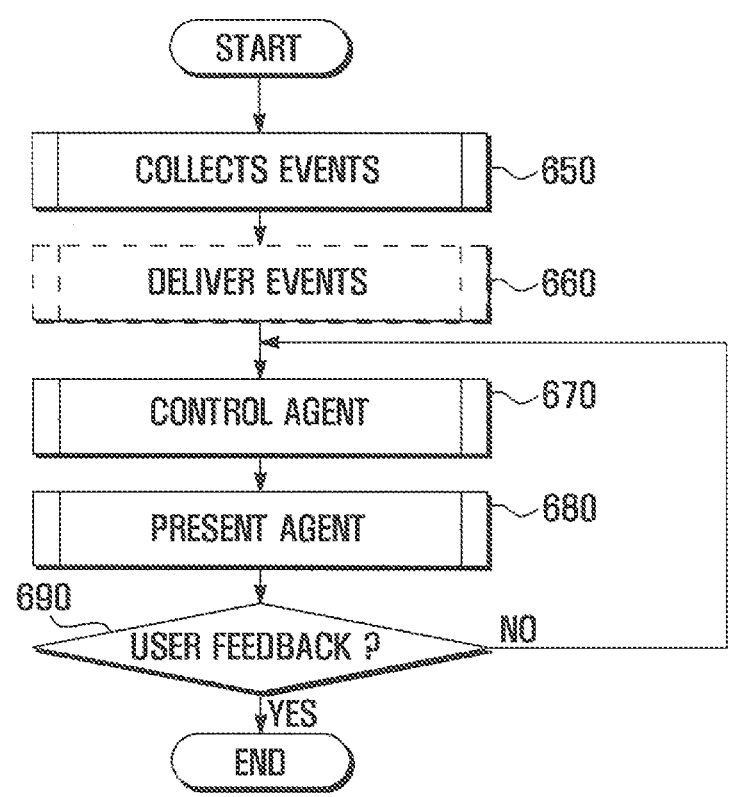
FIG. 21 is a flowchart illustrating an operation of the agent system of FIG. 20.

FIG. 21 is a flowchart illustrating an operation of the agent system of FIG. 20.

Referring to FIG. 21, if an event occurs, the controller 100 collects the event and generates an event message (650). Next, the control unit 100 delivers the event message to a device, which processes the event. The device can be the agent controller 630 of the agent system of FIG. 20. In the case that the event is collected by only the event collector 610, the agent UI expression part 640 can be omitted. In this case, the event is directly delivered from the event collector 610 to the agent controller 630. Next, the control unit 100 analyzes the event message (670) and then selects a specialist entity for processing the event message. The specialist entity sets an UI ID. Next, the control unit 100 retrieves a character UI corresponding to the UI ID from a character memory of memory unit 23 and displays the character UI through the display unit 27 (680).

The character UI may provide a user feedback request function so as to allow the user to input a feedback. If a user feedback is input, the control unit 100 detects the user feedback (690) and repeats the step 670 according to the user feedback.

As described above, the mobile phone selects a character UI corresponding to the occurred event and performs the character agent function.

Figure 22:
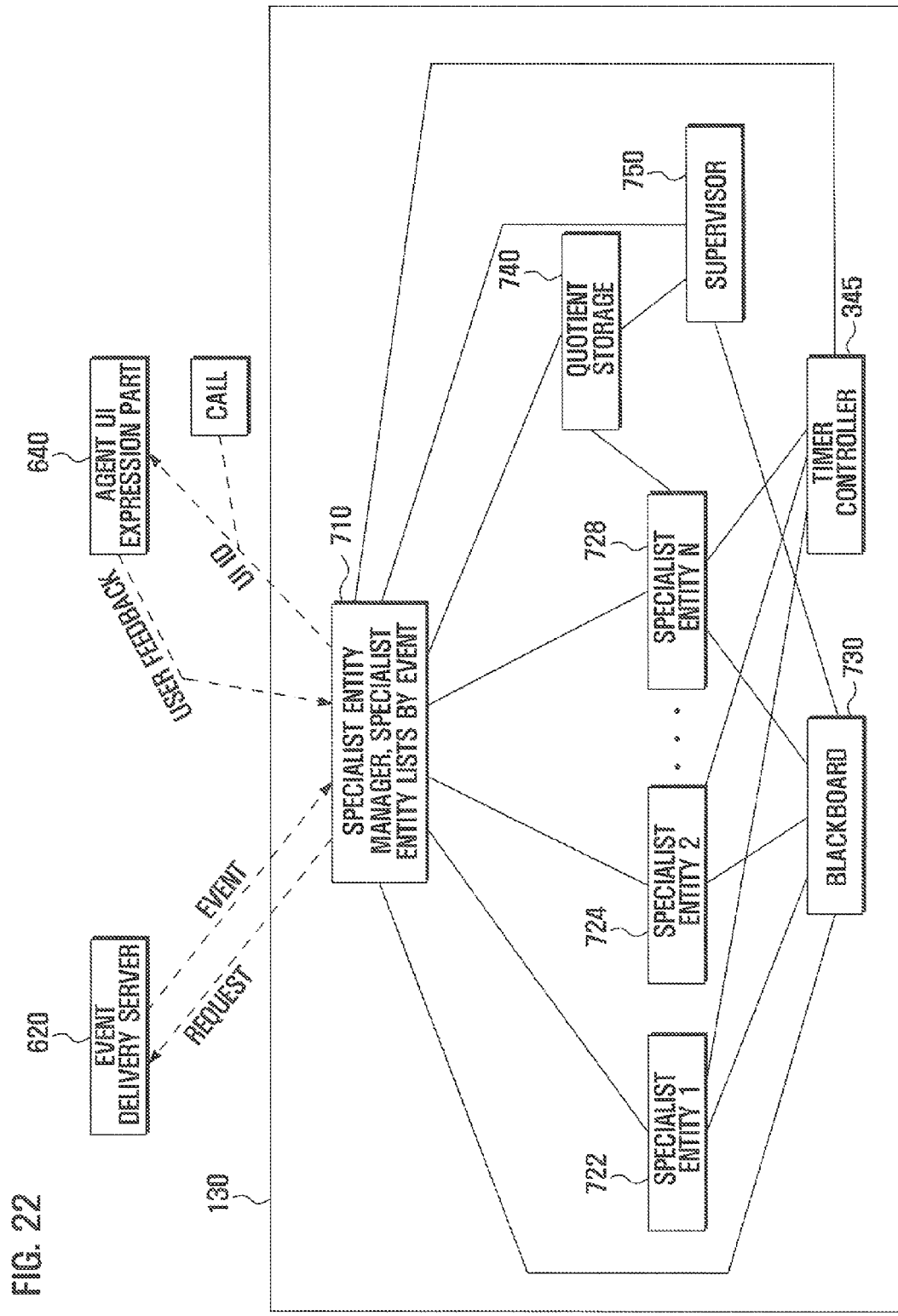
FIG. 22 is a block diagram illustrating a configuration of the agent controller of the agent system of FIG. 20.

FIG. 22 is a block diagram illustrating a configuration of the agent controller of the agent system of FIG. 20. The agent controller 630 manages a plurality of specialist entities 722 to 728, determines UI IDs provided by the specialist entities 722 to 728, and reports the UI IDs to the agent presenter 640. The control unit 10 operates according to the user feedback input through the character UI.

Referring to FIG. 22, the agent controller 630 stores the event message received from the event delivery server 620 into an internal buffer (blackboard) 730, and controls a specialist entity corresponding to the event to set the UI ID and to forward the UI ID to the agent presenter 640. The agent presenter 640 presents an UI agent corresponding to the UI ID so as to allow the user to input a feedback. If the user feedback is input, the agent controller 630 controls the agent function according to the user feedback. The agent controller 630 is provided with a plurality of specialist entities 722 to 728 having the UI IDs associated with usage cases, a blackboard for storing the information on the event messages, a supervisor 750 selecting at least one specialist entity for performing the UI presentation when multiple specialist entities are associated with the occurred event, a character quotient storage 740 for managing the character quotients according to the events, a timer processor 745 for managing activation times of the specialist entities 722 to 728, and a specialist entity manager 710 for selecting one of the specialist entities 722 to 728 associated with the occurred event and controls the agent function according to the occurred event.

Figure 23:
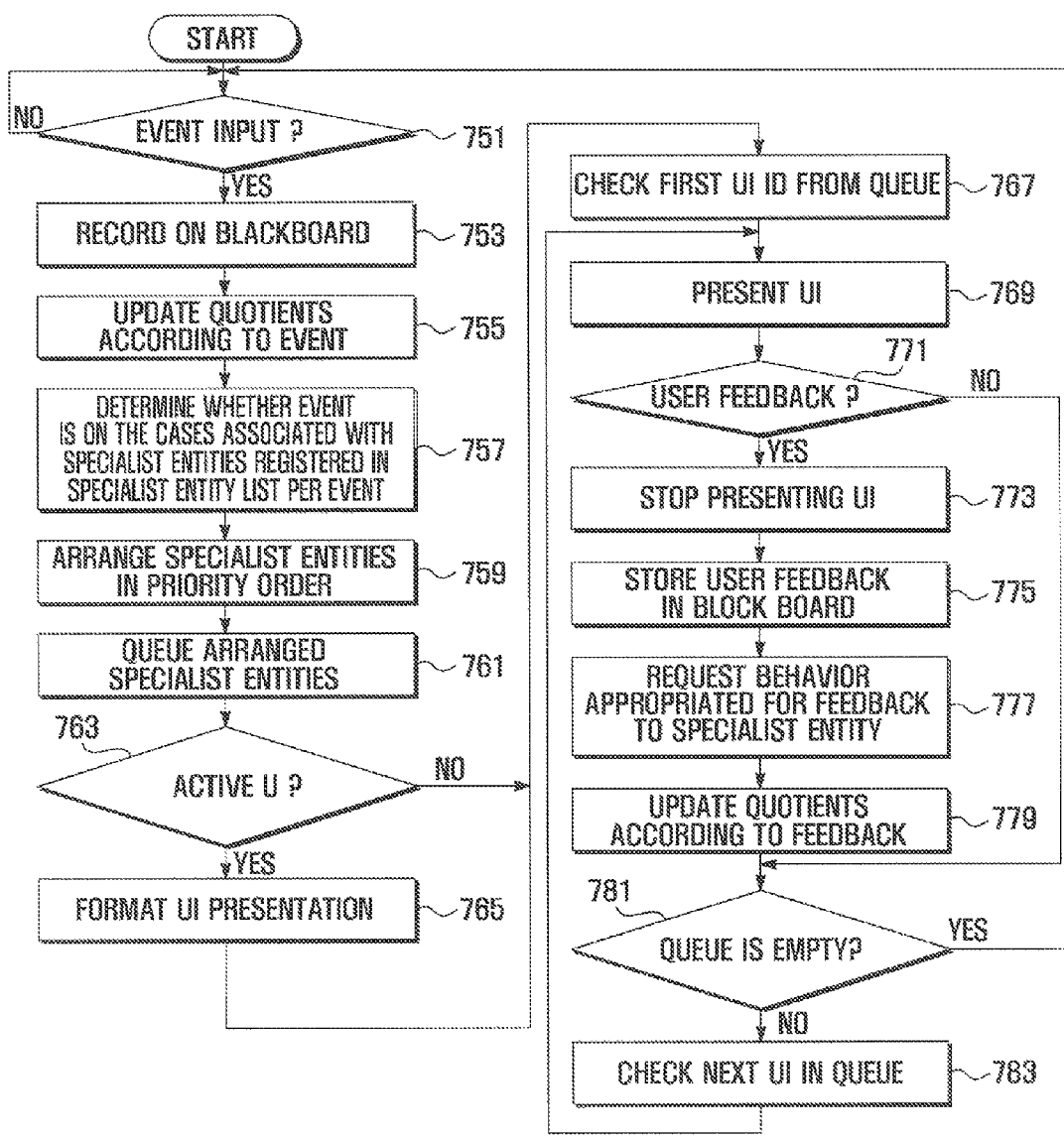
FIG. 23 is a flowchart illustrating an agent function control procedure of the agent controller of FIG. 22.

FIG. 23 is a flowchart illustrating an agent function control procedure of the agent controller 230 of FIG. 22. The agent controller 630 checks the specialist entities for presenting the character UI according to the occurred event and designation priorities and user preferences of the specialist entities. Next, the agent controller 630 determines an order of the specialist entities on the basis of the UI presentation priorities and presents the UI ID of the specialist entities according to the UI presentation order.

Referring to FIG. 23, the agent controller 630 waits an event message (751). If the event message is received, the agent controller 630 collects the information associated with the received event and stores the information in the blackboard 730 (753). Next, the agent controller 630 checks the quotients associated with the event and then updates the quotients stored in the character quotient storage 740 (755). The character quotients may include HQ, EQ, IQ, and SQ. The update of the quotients is performed in association with the currently active character. The character has increment and decrement weights information which is specified in a character story. Accordingly, the character quotients increase or decrease by reflecting the weight information. The quotient update is processed in such a manner that the agent controller 630 analyzes the occurred event and determined whether the occurred event is one of the events listed in a character quotient table (see table 13). If the occurred event is one of the events listed in the character quotient table, the agent controller 630 checks the quotients associated with the occurred event from the character quotient table and the quotient weights of the currently active character from a quotient weight table (see table 14) and then stores the quotient values to be increased or decreased into the character quotient storage 740. That is, if an event occurrence is detected, the agent controller 630 stores the quotient values to be increased or decreased into the character quotient storage 740. The character quotient storage 740 stores the quotients in the form of the character quotient table.

Next, the agent controller 630 determines whether the occurred event is one of the cases associated with the specialist entities registered in the specialist entity list per event (757). Next, the agent controller 630 calculates the UI presentation order of the candidate specialist entities for presenting the character UI according to the determination result and arranges appropriate candidate specialist entities in consideration of the UI presentations order (759). The other candidate specialist entities are excluded. Next, the agent controller 630 arranges the specialist entities involved with the character UI presentations in a priority queue according to the presentation order (761).

Next, the agent controller 630 checks the character UI presented through the display unit 27 and processes the presentation in the order of the specialist entity priorities accumulated in the priority queue (763). A character UI presentation of the specialist entity having 0 UI presentation priority is presented immediately regardless of the current presentation. The character UI presentations of the specialist entities having low presentation priorities wait until the character UI presentation of the specialist entity having a high presentation priority ends. That is, if there is a specialist entity having 0 presentation priority among the specialist entities stored in the priority queue, the agent controller 630 terminates the current character UI presentation (S630). If there is no specialist entity having 0 presentation priority, the agent controller 630 delays the next character UI presentation until the current character UI presentation ends. If a new event occurs so as to set the specialist entities for performing the character presentation, the agent controller 630 terminates the current character UI presentation and then displays the character UI presentation of the specialist entities determined by the event. In this case, the agent controller 630 stops the character UI presentation (765).

After performing the step 765 or if there is no currently presented character UI, the agent controller 630 retrieves a UI ID of the specialist entity having the highest UI presentation priority among the specialist entities stored in the priority queue (767) and then presents the character UI of the corresponding specialist entity through the agent presenter 640 (769). The specialist entity used for presenting the character UI is discarded from the priority queue. The character UI includes user feedback-requesting character UIs and non-feedback-requesting character UIs. If a feedback is input while the user feedback-requesting character UI is presented, the agent presenter 640 reports the feedback input to the agent controller 630. If the feedback input is detected (771), the agent controller 630 stops displaying the current character UI presentation (773) and stores information on the feedback in the blackboard 730 (775). Next, the agent controller 630 controls the specialist entity associated with the character UI to perform an action in response to the feedback (777). The specialist entity is provided with the UI IDs for performing the operation corresponding to the feedback result (positive feedback or negative feedback) and the agent controller 630 delivers the UI ID corresponding to the operation of the specialist entity to the agent presenter 640 so as to display the character UI presentation.

The agent controller 630 checks the quotient values associated with the feedback result and then updates the character quotients stored in the character quotient storage 740 (779). Even in the case of the event in response to the user feedback, the agent controller 630 performs the character quotient update as in step 755.

If a non-feedback-requesting character UI is used or there is no user feedback in a predetermined time, or after the step 779 is complete, the agent controller 630 determines whether the priority queue is empty (781). If the priority queue is not empty, the agent controller 630 checks the UI ID of the specialist entity having the next UI presentation priority among the waiting specialist entities (783) and repeats the step 769 to present the character UI. The specialist entity presented the character UI is removed from the priority queue.

By repeating the above procedure, the character UIs of the specialist entities waiting in the priority queue are sequentially presented. If the character UIs of all the specialist entities waiting in the priority queue are presented, the agent controller 630 ends the character UI presentation procedure and waits receiving another event message.

In this manner, the character UI presentation is performed with the mobile phone-triggered events and the user feedback-triggered events. The character quotients are updated in accordance with the events. In the case of the specialist entity for presenting the user feedback UI, the character quotients are updated in accordance with the user feedback. The character quotients are used for expressing the growth state of the character in the mobile phone.

As described above, the character UI is presented so as to reflect the events occurred in accordance with the use of the mobile phone and feedbacks in response to the events. The quotients values designated for the events occurred in the mobile phone and the user feedbacks in response to the events are reflected to the character quotients listed in the character quotient table. The user feedbacks can be used for determining the emotion of the character in association with the state transition model of the character. The state determination and character presentation procedures can be performed as shown in FIGS. 9 to 14, 16, and 17. The character quotient reflection module may modify the character quotient values in accordance with the events and feedbacks before reflection the character quotients while processing the events and the feedbacks in response to the events as shown in FIG. 23. After determining the state of the character as shown in FIG. 15, the emotion of the character is determined according to the procedures of FIGS. 24a and 24b.

Figure 24A:
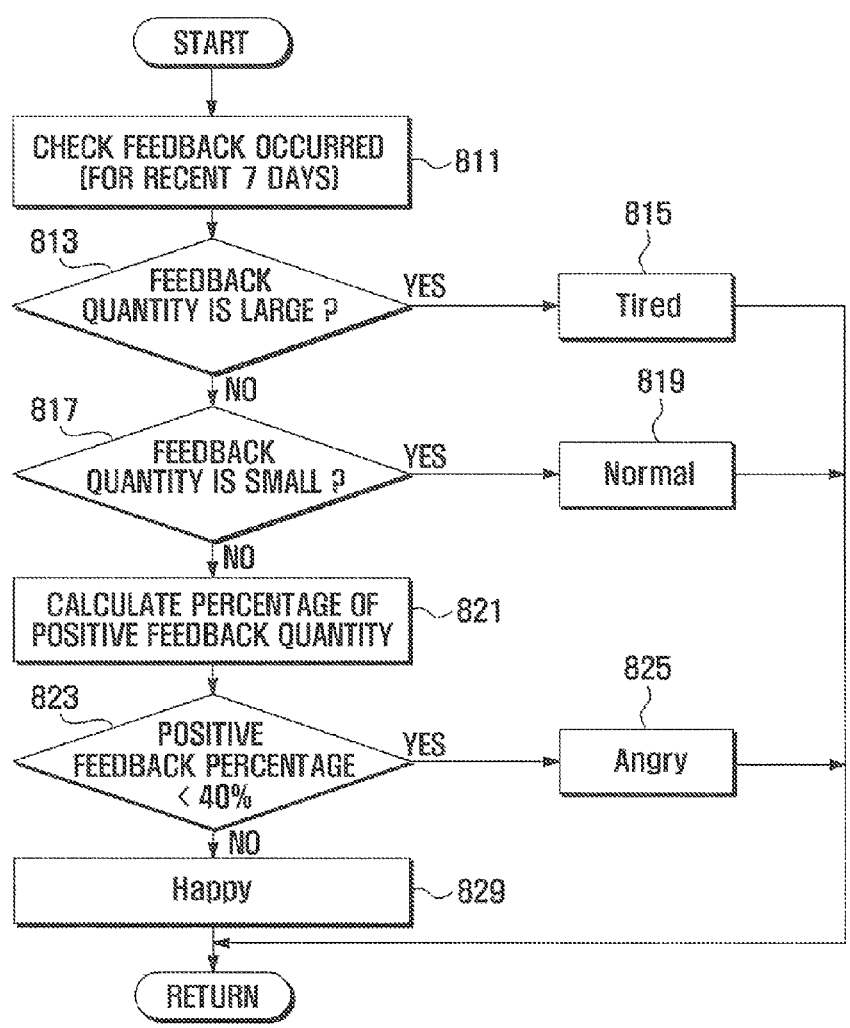
FIG. 24 is a flowchart illustrating character emotion determination procedures in a status expression system structured in FIGS. 20 to 23.
Figure 24B:
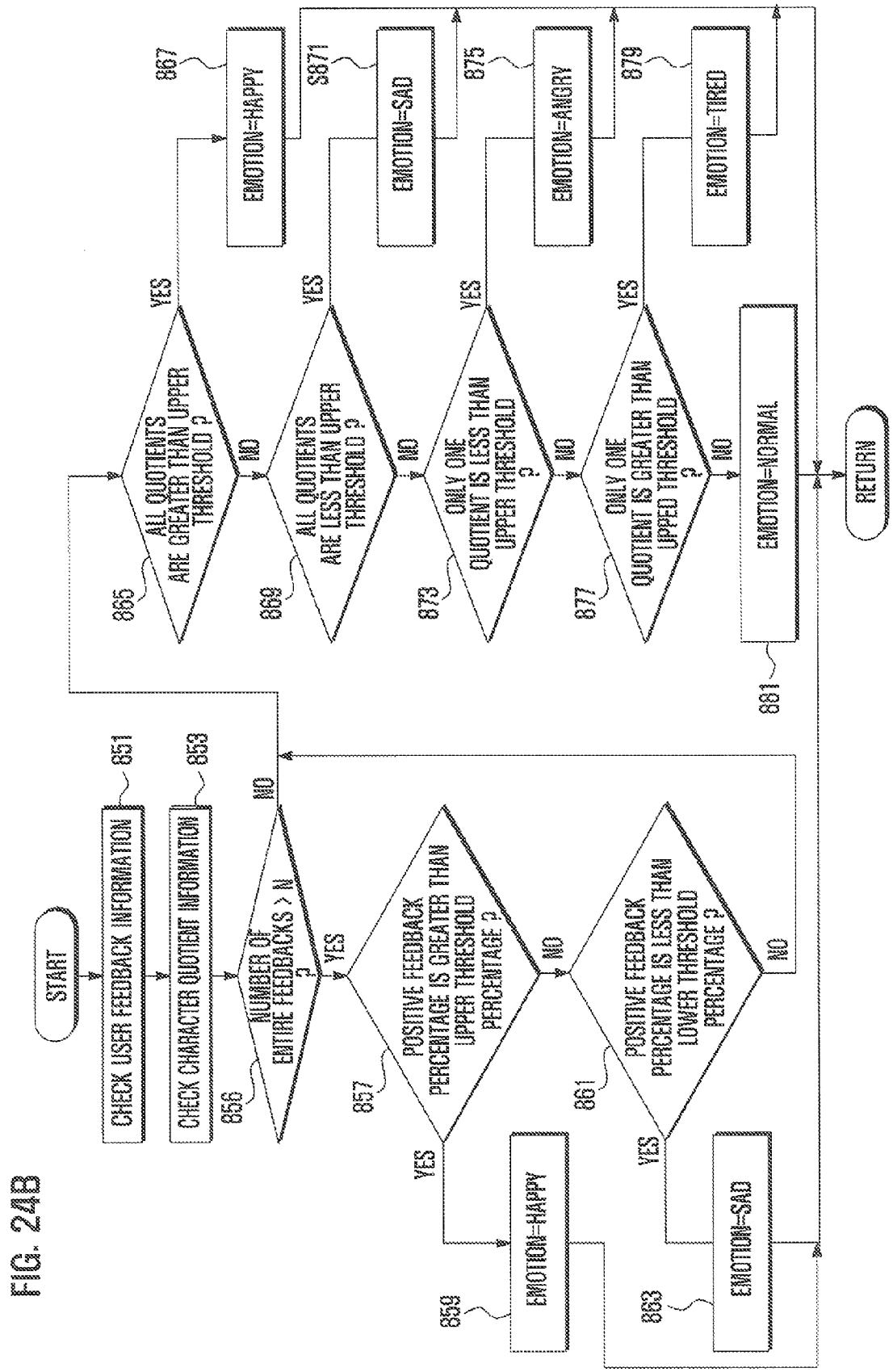

FIGS. 24a and 24b are flowcharts illustrating character emotion determination procedures in a character agent system according to embodiments of the present invention.

In FIG. 24a, an emotion of the character is determined on the basis of a number of the feedbacks and feedback properties.

After determining the state transition model of the character using the state transition determination module at step 115 of FIG. 13, the control unit 100 determines the emotion of the character in association with the state transition model at steps 151 and 153. The steps 151 and 153 are performed in the procedure of FIG. 14 in detail. After checking the currently active character and the state of the character at steps 411 and 413 of FIG. 14, the emotion of the character is determined according to the character emotion determination procedure of FIG. 24a or FIG. 24b.

Referring to FIG. 24a, after the state transition model is determined, the control unit 100 retrieves the feedback information stored in the character quotient storage 740 for a predetermined time duration (811). The time duration may be a recent week and the feedback information may be a feedback input through the agent presenter 640. In order to determine the emotion, a number of the feedbacks and property (positive or negative) of the feedback are used as the determination factors. The emotion of the character is determined on the basis of the two factors. The controls unit 100 determines whether a number of the feedback is greater than a predetermined first threshold value (813). If the number of the feedbacks is greater than the threshold value, the control unit 100 determines the emotion of the character is "tired" (815). If the number of the feedbacks is not greater than the threshold value, the control unit 100 determines whether the number of the feedbacks is less than a predetermined second threshold value (817). If the number of the feedbacks is less than the second threshold value, the control unit 100 determines the emotion of the character is "normal" (819). On the other hand, if the number of the feedbacks is between the first and second threshold values, the control unit 100 calculates a positive-to-negative ratio of the feedbacks (821). After calculating the positive-to-negative ratio, the control unit 100 determines whether the positive feedbacks occupies less than a predetermined threshold percentage (in this embodiment, 40%) (823). If the positive feedbacks occupy less than the threshold percentage, the control unit 100 determines the emotion of the character is "angry" (825). If the positive feedbacks occupy not less than the threshold percentage, the control unit 100 determines the emotion of the character is "happy" (829).

As described above, the emotion of the character is determined as "tired" if the number of the feedbacks is greater than an upper threshold value, "normal" if the number of the feedbacks is less than a lower threshold value, "angry" if the number of the feedbacks is between the upper and lower threshold values and the positive feedbacks occupy less than a threshold percentage, and "happy" if the number of the feedbacks is between the upper and lower threshold values and the positive feedbacks occupy not less than the threshold percentage. It is possible to use a correlation of the two factors for determining the emotion of the character. In this case, the control unit 100 sets the emotion of the character to "happy" if the number of the feedbacks is large and positive feedbacks prevail, to "normal" if the number of the feedbacks is small and positive feedbacks prevail, to "angry" if the number of the feedbacks is large and the negative feedbacks prevail, to "tired" if the number of the feedbacks is large and the positive feedback amount is almost equal to the negative feedback amount, and to "sad" if the number of the feedbacks is small and the negative feedback prevail.

In FIG. 24b, an emotion of the character is determined on the basis of the feedback information and the character quotient information. The feedback information includes a number of the feedback requests and a number of the feedbacks, and the character quotient information includes SQ, EQ, IQ, and EQ. The character quotients have the same maximal value (quotient_max_value). The control unit 100 checks the user feedback information (851) and the character quotient information (853). The user feedback information means the feedback in response to a feedback input request of the character agent system and includes a number of the feedback input requests and a number of the positive feedbacks input for a predetermined time duration (1 week). The character quotient information includes SQ, EQ, IQ, and HQ having the same maximal value (quotient_max_value).

Next, the control unit 100 determines the number of the feedbacks is greater than the threshold value (856). If the number of the feedbacks is greater than the threshold number, the control unit 100 determines whether a percentage of the positive feedbacks among the entire feedbacks is greater than an upper threshold percentage (857). If the percentage of the positive feedbacks is greater than the upper threshold percentage, the control unit 100 sets the emotion of the character to "happy." If the percentage of the positive feedbacks is not greater than the upper threshold percentage, the control unit 100 determines whether the percentage of the positive feedbacks is less than a lower threshold percentage (861). If the percentage of the positive feedbacks is less than the lower threshold percentage, the control unit 100 set the emotion of the character to "sad." Here, the threshold value of the feedback is 10, and the upper and lower threshold percentages of the positive feedbacks are 70% and 30%, respectively. Accordingly, if the number of the feedbacks occurred in 1 week is 11 and the percentage of the positive feedbacks is greater than 70%, the control unit 100 sets the emotion of the character to "happy." If the number of the feedbacks occurred in 1 week is 11 and the percentage of the positive feedbacks is less than 30%, the control unit 100 sets the emotion of the character to "sad." That is, when the number of the feedbacks is greater than a predetermined value, the control unit 100 presents the character in the happy emotion if the percentage of the positive feedbacks is high and in sad emotion if the percentage of the positive feedbacks is low.

In the case, however, that the percentage of the positive feedbacks are between the upper and lower threshold percentages, the control unit 100 determines the emotion of the character on the basis of the quotient analysis rather than the feedback property. In this case, the control unit 100 determines whether all character quotients have values greater than a maximal quotient value (865). If the values of all the character quotients are greater than the maximal quotient value, the control unit 100 sets the emotion of the character to "happy." If the values of all the character quotients are not greater than the maximal quotient value, the control unit 100 determines whether all the quotient values are less than the maximal quotient value (869). If all the quotient values are less than the maximal quotient value, the control unit 100 sets the emotion of the character to "sad." If all the quotient values are not less than the maximal quotient value, the control unit 100 determines whether one of the quotients has a value less than the maximal quotient value (873). If one of the quotients has a value less than the maximal quotient value, the control unit 100 sets the emotion of the character to "angry." If more than one of the quotients have a value less than the maximal quotient value, the control unit 100 determines whether one of the quotients has a value greater than the maximal quotient value (877). If one of the quotients has a value greater than the maximal quotient value, the control unit 100 sets the emotion of the character to "tired." If more than one of the quotients has values greater than the maximal quotient value, the control unit 100 sets the emotion of the character to "normal." The maximal quotient value is preferably set to 50%.

After determining the emotion of the character, the control unit 100 presents the character with the determined emotion by loading the character resourced associated with the emotion. The resource loading procedure is performed as shown in FIG. 16, in which the character is presented with the animation, sound, and text expressions according to the determined state and emotion.

In the state presentation method using a character according to an embodiment of the present invention, the character presentation is performed by determining the state of the character and loading the character resources associated with the state.

Figure 25:
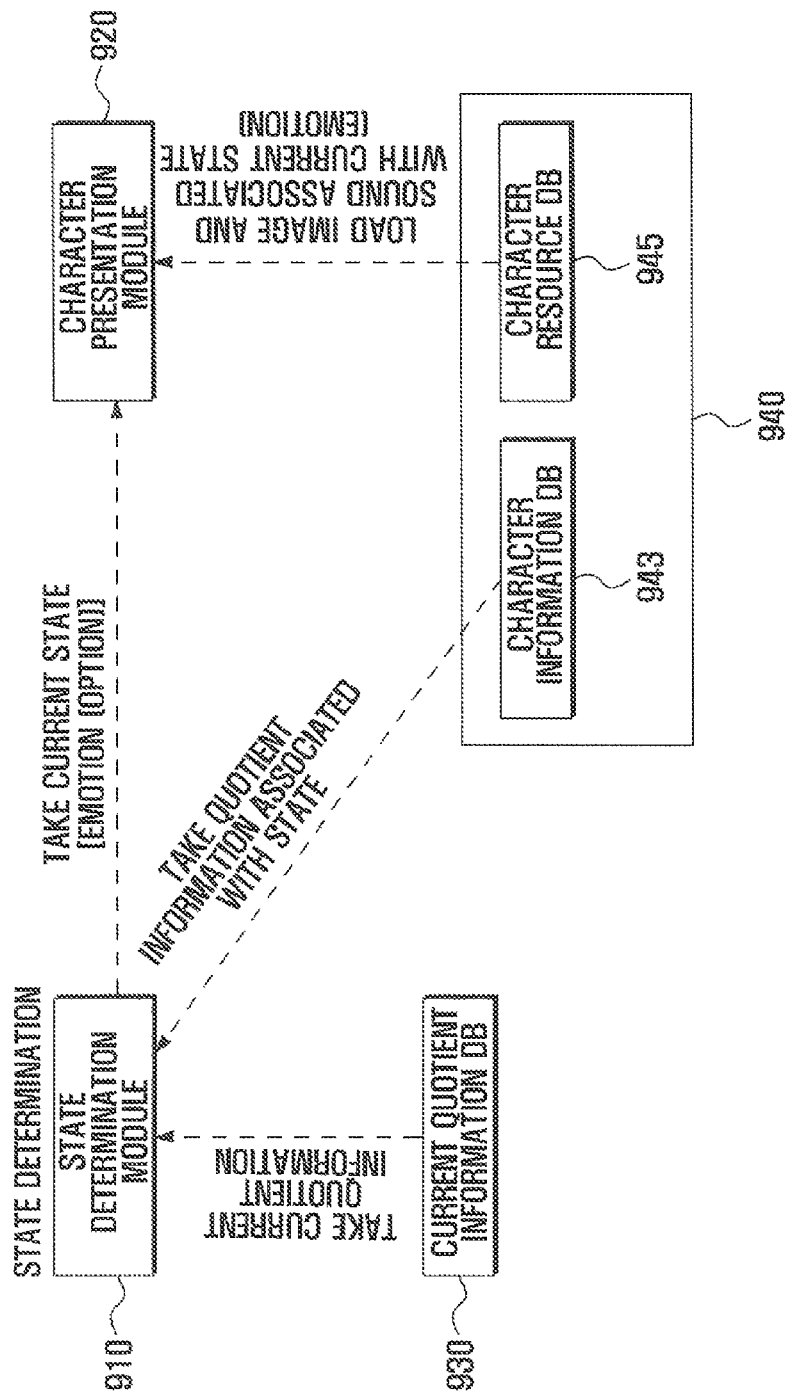
FIG. 25 is a block diagram illustrating a procedure for presenting a state of the mobile on the basis of the quotient analysis in the status expression system according to an embodiment of the present invention.

FIG. 25 is a block diagram illustrating a procedure for presenting a state of the mobile on the basis of the quotient analysis in the character agent system according to an embodiment of the present invention.

Referring to FIG. 25, if an event (or a user feedback) occurs, the quotient reflection module (not shown) refers to the event table (see table 13) so as to determine whether the event is a quotient increment/decrement event. If the event is a quotient increment/decrement event, the control unit 100 checks the kinds of quotients to be updated from the event table and the weights of the quotients from the quotient weight table (see table 14). Next, the control unit 100 updates the corresponding character quotients in the character quotient table (see table 15) on the basis of the kinds of the quotients associated with the event and the weights of the quotients. The character quotient table represents a current quotient information database (DB) 930. The quotient reflection module analyzes the event occurred in the mobile phone and character quotients associated with the event and then updates the quotients in the current quotient information DB 930.

If the time for presenting the character expression has arrived, the character state determination module 910 determines a target state of the character by reading the character quotients recorded in the current character quotient information DB and the state recorded in the character information DB 940. The character information DB 940 has the quotient ranges of the character for the growth state transition model and the transformation state transition model. In the growth state transition model, minimal values of the character quotients for each state are stored. In the transformation state transition model, weights of the quotients and states represented by quotient sets are stored. The character state determination module 910 performs the state determination procedure according to the current state transition model.

A state determination procedure for the growth state transition module is described hereinafter, the character state determination module 910 retrieves the character quotient values from the current character quotient information DB 930 and then retrieves the minimal values of the character quotients of the growth states. Next, the character state determination module 910 compares the current character quotient values of the character with the minimal values of the character quotients for the growth states, and then determines a the target state of the character on the basis of the comparison result.

In the case of the transformation state transition model, the character state determination module 910 retrieves the character quotient values from the current character quotient information DB 930 and then determines any of the character quotients has a value greater than a predetermined threshold value. If there is a character quotient of which valued is greater than the threshold value, the character state determination module 910 selects the quotient as a first quotient. Next, the character state determination module 910 retrieves the weights of the quotients from the character information DB 940 and determines the second quotient by executing a random lottery module in consideration of the quotient weights. Next, the character state determination module 910 refers to the transformation state definition table from the character information DB and determines the transformation state corresponding to a quotient set having the first and second quotients.

The character can be presented in a growth state and/or a transformation state with an emotion. There can be a plurality of emotions for a state. In order to express the state with an emotion, the character state determination module 910 determines the emotion of the character on the basis of the quotient values of the character or the event processing results. In the case of determining an emotion on the basis of the character quotients, the character state determination module 910 retrieves the character quotients values from the current character quotient information DB 930 and then determines the emotion by comparing the quotients values with predetermined threshold values. In the case of determining an emotion on the basis of the event processing result, the character state determination module 910 analyzes a number of feedbacks occurred for a predetermined time duration and determines the emotion according to the analysis result.

The character state determination module 910 can determines a target state of the character on the basis of the character quotient values and the emotion of the character on the basis of the character quotient values or the event processing results. The emotion model may not be used.

After a state (and an emotion) is determined, the character presentation module 920 retrieves character resources associated with the state (and the emotion) from the character resource DB 945 and then presents the character with the retrieved resources. The character resources include character animations, sounds, and texts and these resources are provided for respective states (emotions).

If both the state transition model and emotion model are used, the character resources are provided for the respective state transition model and emotion model. Accordingly, after determining the state of the character, the character presentation module 920 retrieves the character resources corresponding to the determined state from the character resource DB 945 and retrieves, if the emotion model is used, character resources corresponding to the determined emotion from the character resource DB 945, thereby presenting the character in the determined state with an emotion expression.

As described above, the mobile phone operating with the character agent system analyzes the usage pattern of the mobile phone and provides an UI appropriate for the usage pattern with a character which presenting the state (and emotion) of the mobile phone. The character is an important GUI element allowing the mobile phone to interact with the user input. In this embodiment, the character is presented in various shapes and emotions according to the mobile phone usage pattern and representing the usage pattern of the user. In order to cause the growth or variation of the character, various functions are provided.

The character presentation can be performed on the basis of the mobile phone-triggered events and the user-triggered events.

Figure 26A:
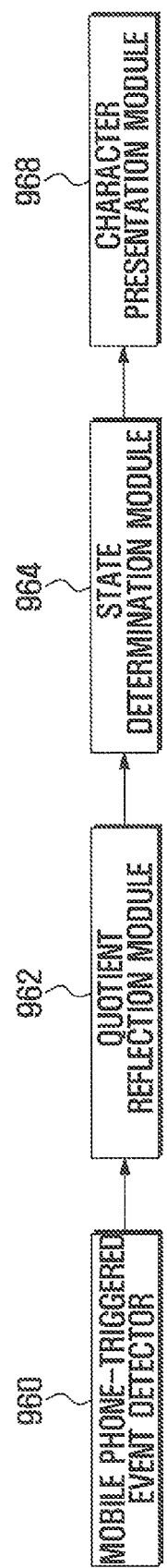
FIG. 26a is a block diagram illustrating a configuration of a status expression system according to an embodiment of the present invention when mobile phone-triggered events are used.

FIG. 26a is a block diagram illustrating a configuration of a character agent system according to an embodiment of the present invention when mobile phone-triggered events are used.

The character is presented by a state reflecting the characteristics of the character, and the state is determined on the basis of the quotient values reflecting the mobile phone usage pattern. In this embodiment, the character quotients include SQ, EQ, IQ, and HQ. The character quotients are values obtained by quantifying the mobile phone usage pattern and associated with features of the applications installed in the mobile phone. Accordingly, if an event occurs, the control unit 100 analyzes the event to obtain quotients values assigned for the event and accumulates the quotients values. That is, if an event occurrence is detected by a mobile phone-triggered event detector 960, a character quotient reflection module 962 checks the quotient values (SQ, EQ, IQ, and HQ) assigned for the event and then stores the quotient values as the character quotient information. This operation repeats whenever any event occurs in the mobile phone, and the accumulated character quotients are used for determining the state of the character.

The character state is a medium for presenting the conditions of the mobile phone according to the variation of the character quotients reflecting the mobile phone usage pattern. The character state can be presented in different manner according the state transition model. The state determination is performed by the character state determination module 964. The character state determination module 964 analyzes the accumulated character quotients with reference to the character quotient ranges for determining the state of the character. In this embodiment, the growth state transition model and transformation state transition model are used. In the case that the growth state transition model is used, the state transition is expressed with a character state image matching the character quotient ranges. In the case that the transformation state transition model is used, the state transition is expressed with a character state image associated with the character quotients satisfying specific conditions. In the transformation state transition model, the character state can be determined by referring at least two character quotients. In this case, a character quotient greater than a predetermined maximal quotient value is selected as the first quotient, and the second quotient is randomly determined. The character state determination module 964 determines a target state of the character according to the kinds of the two selected quotients. In this embodiment, the character has 10 transformation states as shown in FIGS. 6b and 6c.

After the state of the character is determined, the character presentation module 968 retrieves the state presentation information from the character resource table and presents the character on the basis of the state presentation information. The character state presentation information can be a character image associated with the character state and include sound and text expressions to be presented together with the character image. When transiting the character state, the character presentation module 968 can present at least one intermediate animation image between presentations of an old character state image and a new character state image.

FIG. 26b is a block diagram illustrating a configuration of a character agent system according to an embodiment of the present invention when mobile phone-triggered events and user-triggered events are used.

Referring to FIG. 26b, the character agent system includes a mobile phone-triggered event detector 960 and a user-triggered event detector 970. The mobile phone-triggered event includes call connection-related events, multimedia-related events, information registration-related result, and internal operation-related events. The user-triggered event is feedback event input by the user in response to feedback requests generating while or after processing the mobile phone-triggered events. For example, the user-triggered event can be a feedback in response to a caller ID registration request generating after a call reception. That is, the user-triggered event can be a feedback event in response to the mobile phone-triggered event. In this case, the character state can be determined on the basis of both the mobile phone-triggered event and the user-triggered event.

In order to present the state of the mobile phone in the form of a character state determined in accordance with the mobile phone-triggered and the user-triggered events, the character agent system is provided with the character state transition models and the emotion models. The mobile phone determines a target state of the character and an emotion appropriated for the state. The state of the character is a standard format for presenting the character in various behaviors in accordance with the variation of character quotients and characteristics of the character. The emotion is a format for presenting a certain condition of the mobile phone caused by interactions with the user. The emotion of the character is determined by selecting a target state of the character according to the event analysis and selecting an emotion corresponding to the user feedbacks in response to the events.

If a mobile phone-triggered event occurs, the character quotient reflection module 962 checks the kinds of the quotients (SQ, EQ, IQ, and HQ) associated with the mobile phone-triggered events from the character quotients table and accumulates the quotient values assigned for the event as the character quotient information. This operation is performed whenever the mobile phone-triggered event occurs. The accumulated character quotients are used as the information for determining the state of the character. After the event is processed, a user-triggered feedback event may occur in response to a feedback request of the mobile phone. The user-triggered event also can be quantified. The quantification of the user-triggered event is performed by the character quotient reflection module 962. The quantification of the user-triggered event is not explained in the present invention. In one embodiment of the present invention the emotion of the character is determined on the basis of a number of the user-triggered events and the properties of the user-triggered events. The emotion determination is performed by the character emotion determination module 964.

The state transition of the character is determined by the character state determination module 964. The character state determination module 964 determines whether to transit the state of the character by comparing the accumulated character quotients with the threshold values defining the character quotient ranges. In an embodiment of the present invention, the growth state transition model and the transformation state transition model can be used and the state of the character is determined in the respective state transition models.

After the character state is determined, the character emotion determination module 966 determines an emotion in consideration with the state determined as above. The emotion of the character can be determined on the basis of a number and properties of the user feedbacks. For example, the emotions is determined according to the properties (positive or negative) of the user feedbacks if the number of the user feedbacks is greater than a threshold value, and determined on the basis of the quotient values of the character if the number of the user feedback is less than or equal to the threshold value.

The character presentation information can be a character image selected on the basis of the state and emotion of the character. The character image can be presented with sound and text expression associated with the state and emotion of the character. When the state transition is required, the character presentation module 968 presents an intermediate character animation notifying the state transition between presentations of an old state character image and a new state character.

The character state can be changed using the mobile phone-triggered events and special items.

Figure 26C:
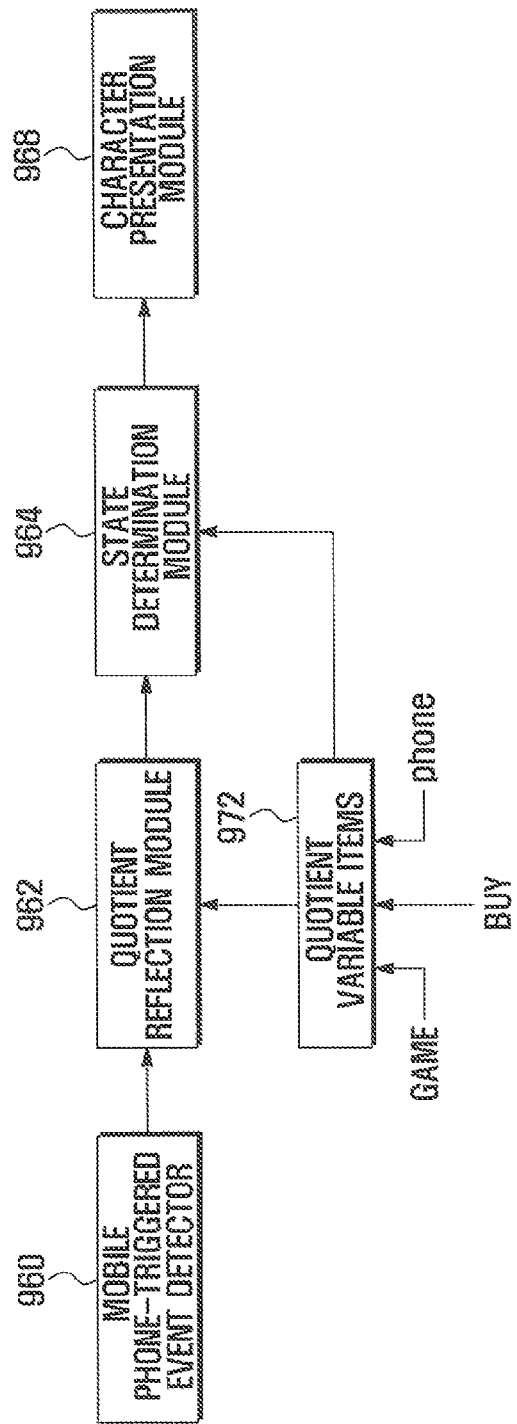
FIG. 26c is a block diagram illustrating a configuration of a status expression system according to an embodiment of the present invention when mobile phone-triggered events and special items are used.

FIG. 26c is a block diagram illustrating a configuration of a character agent system according to an embodiment of the present invention when mobile phone-triggered events and special items are used, and FIG. 26d is a block diagram illustrating a configuration of a character agent system according to an embodiment of the present invention when special items are used.

Referring to FIGS. 26c and 26d, a mobile phone-triggered event detector 960 determines the events that occur according to mobile phone usage pattern of the user. When the special items are used, the character state is determined in association of the special items. In a case that a mobile phone is almost used for communications, SQ is high relative to other quotients such that the character state is determined mainly on the basis of SQ. In an embodiment of the present invention, quotient variable items 972 are used in addition to the character quotients. The items 972 includes single quotient variable items for changing a specific quotient, entire quotients variable items for changing all quotients, and state variable items for changing the state of the character.

As described above, the character agent system for a mobile phone define a state of the mobile phone on the basis of events occurred while operating the mobile phone and user feedbacks input in response to the events and presents the state of the mobile phone in the form of a character. The character can present the states of the mobile phone in various state transition models that can be selected by a user. The state transition model can be operated in association with emotion model for expressing various emotions of the character.

Accordingly, the character agent system for a mobile phone according to the present invention is advantageous to allow the user to intuitively recognize the state of the mobile phone by means of the character having various states and emotions.

Although exemplary embodiments of the present invention have been described in detail hereinabove, it should be clearly understood that many variations and modifications of the basic inventive concepts herein taught which may appear to those skilled in the present art will still fall within the spirit and scope of the present invention, as defined in the appended claims.

What is claimed is:

1. A status expression system for a mobile phone, comprising:
    a memory for storing a plurality of character quotients, information on at least one state transition model, and resources for presenting a character;
    a character controller for updating the plurality of character quotients obtained by quantifying operating events of the mobile phone, determining a state by analyzing the character quotients and referring to the at least one state transition model, and formatting the state using the resources assigned for a state of the character; and
    a display for presenting the character with the resources in the state,
    wherein the character controller comprises:
    a quotient reflection module for checking kinds and values of quotients associated with the operating events and the user feedback events of the mobile phone and accumulating the values so as to update the character quotients;
    a state determination module for determining a state model of the character with reference to a set of at least two character quotients and a state transition model; and
    a character presentation module for presenting the character in the state model determined by the state determination module using the resources assigned for the state of the character.

2. The status expression system of claim 1, wherein the operating events are classified into communication events and non-communication events, and the quotient reflection module updates the quotients associated with the event with reference to a character quotient table listing the communication events and non-communication events defining kinds and amounts of quotients associated with the event.

3. The status expression system of claim 2, wherein the character can be presented in at least two states, and the state determination module analyzes the quotients of the character and determines a target state of the character on the basis of the analysis result.

4. The status expression system of claim 3, wherein the character is presented in a transformation state transition model having at least two transformation states, and the state determination module analyzes the character quotients in relation to quotient ranges for the respective transformation states and determines the transformation state of the character on the basis of the analysis result.

5. The status expression system of claim 3, wherein the character is presented in a growth state transition model having at least two growth states, and the state determination module analyzes the character quotients in relation to quotient ranges for the respective grow states and determines the growth state of the character on the basis of the analysis result.

6. The status expression system of claim 5, wherein the character presentation module presents a state transition animation between presentations of the character in old and new states.

7. The status expression system of claim 2, wherein the quotients are amounts obtained by quantifying the operating events occurred in the mobile phone and comprises a social quotient obtained by quantifying the communication events, emotional quotient obtained by quantifying multimedia-related events of the non-communication events, intelligent quotient obtained by quantifying stored information-related events of the non-communication events, and a physical quotient obtained by quantifying performance-related events of the non-communication events.

8. The status expression system of claim 7, wherein the state determination module changes a target state of the character according to a quotient of which value reaches an upper threshold value.

9. The status expression system of claim 7, wherein the state determination module determines a target state of the character according to two quotients, a first quotient of which value is greater than a threshold value and a second quotient selected at random.

10. The status expression system of claim 2, further comprising:
an emotion determination module for determining an emotion of the character on the basis of an analysis result on the operating events in association with the state,
wherein the character presentation module presents the character in the state model with the emotion using the resources assigned for the state and emotion of the character.

11. The status expression system of claim 10, wherein the emotion determination module determines an emotion appropriate for the state of the character according to a number and properties of the user feedback events.

12. The status expression system of claim 1, wherein said state transition model comprises a growth state transition model that determines a presentation priority, which determines a range of the character quotient, wherein a higher priority state transition model is selected as the quotient level increases by accumulation of the quotient values.

13. A method for operating a status expression system for a mobile phone in which a state of the mobile phone is presented by a character, comprising:
checking, if operating events of the mobile phone occurs, kinds and values of quotients associated with the operating events of the mobile phone and accumulating the values so as to update the quotients obtained by quantifying operating events of the mobile phone;
determining a state of the character with reference to a set of at least two character quotients and a state model; and
presenting the character in the state model determined using resources assigned for the determined state model of the character checking, if a user feedback event according to the operating events occurs, kinds and values of quotients associated with the user feedback event and accumulating the values so as to update the quotients.

14. The method of claim 13, wherein the operating events are classified into communication events and non-communication events, and the quotients associated with the event are updated with reference to a character quotient table listing the communication events and non-communication events defining kinds and amounts of quotients associated with the event.

15. The method of claim 14, wherein the character can be presented in at least two states according to the state determined on the basis of an analysis result of the quotients.

16. The method of claim 15, wherein the character is presented in a transformation state model having at least two transformation states determined by analyzing the quotients in relation to quotient ranges for the respective transformation states.

17. The method of claim 15, wherein the character is presented in a growth state model having at least two growth states determined by analyzing the quotients in relation to quotient ranges for the respective growth states.

18. The method of claim 17, wherein presenting the character comprises: presenting a character image in an old state, presenting a state transition animation, and presenting a character image in a new state.

19. The method of claim 14, wherein accumulating quotients comprises:
analyzing the operating event of a mobile phone;
checking kinds and values assigned to the event,
wherein the quotients are amounts obtained by quantifying the operating events occurred in the mobile phone and comprises a social quotient obtained by quantifying the communication events, emotional quotient obtained by quantifying multimedia-related events of the non-communication events, intelligent quotient obtained by quantifying stored information-related events of the non-communication events, and a physical quotient obtained by quantifying performance-related events of the non-communication events.

20. The method of claim 13, further comprising:
determining an emotion of the character in a determined state model of the character; and
presenting the character using the resources assigned for the determined emotion of the character.

21. The method of claim 20, wherein determining an emotion of the character is performed on the basis of a number and properties of the operating events occurred in the mobile phone.

* * * * *